(12) United States Patent
Wang et al.

(10) Patent No.: US 11,089,552 B2
(45) Date of Patent: Aug. 10, 2021

(54) UPLINK POWER CONTROL METHOD AND COMMUNICATIONS DEVICE

(71) Applicant: Huawei Technologies Co., Ltd., Shenzhen (CN)

(72) Inventors: Yafei Wang, Shanghai (CN); Chi Zhang, Shanghai (CN); Zhengwei Gong, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 27 days.

(21) Appl. No.: 16/503,296

(22) Filed: Jul. 3, 2019

(65) Prior Publication Data

US 2019/0327687 A1 Oct. 24, 2019

Related U.S. Application Data

(63) Continuation of application No. PCT/CN2018/071399, filed on Jan. 4, 2018.

(30) Foreign Application Priority Data

Jan. 6, 2017 (CN) .......................... 201710010991.5
Mar. 24, 2017 (CN) .......................... 201710184415.2

(51) Int. Cl.
  *H04W 52/14* (2009.01)
  *H04W 76/27* (2018.01)
  (Continued)

(52) U.S. Cl.
  CPC ......... *H04W 52/146* (2013.01); *H04L 1/0003* (2013.01); *H04W 52/242* (2013.01);
  (Continued)

(58) Field of Classification Search
  CPC . H04W 52/04; H04W 52/146; H04W 52/242; H04W 52/243; H04W 52/367;
  (Continued)

(56) References Cited

U.S. PATENT DOCUMENTS

2011/0250899 A1   10/2011  Vajapeyam et al.
2013/0163535 A1    6/2013  Anderson et al.
(Continued)

FOREIGN PATENT DOCUMENTS

CN   102893678 A   1/2013
CN   103326809 A   9/2013
(Continued)

OTHER PUBLICATIONS

"Consideration for Uplink Power Control in UL CoMP," 3GPP TSG RAN WG1 Meeting #67, San Francisco, USA, R1-113759, pp. 1-4, 3rd Generation Partnership Project, Valbonne, France (Nov. 14-18, 2011).
(Continued)

*Primary Examiner* — Kent Krueger
(74) *Attorney, Agent, or Firm* — Leydig, Voit & Mayer, Ltd.

(57) ABSTRACT

An uplink power control method and a communications device are described. The method includes receiving, by a terminal device, power control indication information sent by a network device. The power control indication information indicates a first power offset set, and the first power offset set is any one of at least two power offset sets. The method further includes receiving, by the terminal device, a transmit power control (TPC) command sent by the network device. The TPC indicates a first offset in the first power offset set. The method includes determining, by the terminal device, uplink transmit power based on the first offset. Impact of cross interference is considered in determining the uplink transmit power. Thus, the method can meet requirements of future mobile communications and improve system performance.

14 Claims, 10 Drawing Sheets

(51) Int. Cl.
  *H04L 1/00* (2006.01)
  *H04W 52/24* (2009.01)
  *H04W 52/36* (2009.01)
  *H04W 72/04* (2009.01)

(52) U.S. Cl.
  CPC ....... *H04W 52/243* (2013.01); *H04W 52/367* (2013.01); *H04W 72/042* (2013.01); *H04W 72/0473* (2013.01); *H04W 76/27* (2018.02)

(58) Field of Classification Search
  CPC ............ H04W 72/042; H04W 72/0473; H04L 1/0003
  See application file for complete search history.

(56) References Cited

U.S. PATENT DOCUMENTS

| | | |
|---|---|---|
| 2014/0213315 A1 | 7/2014 | Kim et al. |
| 2014/0269454 A1 | 9/2014 | Papasakellariou |
| 2014/0295909 A1* | 10/2014 | Ouchi .................. H04W 52/40 455/522 |
| 2016/0323831 A1* | 11/2016 | Ahn ...................... H04B 7/0689 |
| 2018/0092073 A1* | 3/2018 | Nogami .............. H04W 72/042 |
| 2018/0152924 A1* | 5/2018 | Ouchi ................. H04W 72/042 |
| 2018/0338319 A1* | 11/2018 | Kim .................... H04W 72/044 |
| 2019/0075526 A1* | 3/2019 | Nagaraj ............... H04B 7/0408 |

FOREIGN PATENT DOCUMENTS

| | | |
|---|---|---|
| CN | 105264973 A | 1/2016 |
| EP | 2779760 A1 | 9/2014 |
| EP | 2941006 A1 | 11/2015 |
| WO | 2011031059 A2 | 3/2011 |

OTHER PUBLICATIONS

"3rd Generation Partnership Project; Technical Specification Group Radio Access Network; Evolved Universal Terrestrial Radio Access (E-UTRA); Multiplexing and channel coding (Release 14)", 3GPP TS 36.212, V14.1.1, pp. 1-149, 3rd Generation Partnership Project, Valbonne, France (Jan. 2017).

"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331, V14.0.0, pp. 1-664, 3rd Generation Partnership Project, Valbonne, France (Sep. 2016).

NTT Docomo, Inc., "Initial views on frame structure for NR access technology", 3GPP TSG RAN WG1 Meeting #84bis, Busan, Korea, R1-163112, pp. 1-7, 3rd Generation Partnership Project, Valbonne, France (Apr. 11-15, 2016).

* cited by examiner

UPLINK POWER CONTROL METHOD AND COMMUNICATIONS DEVICE

CROSS-REFERENCE TO RELATED APPLICATIONS

This application is a continuation of International Application No. PCT/CN2018/071399, filed on Jan. 4, 2018, which claims priority to Chinese Patent Application No. 201710010991.5, filed on Jan. 6, 2017 and Chinese Patent Application No. 201710184415.2, filed on Mar. 24, 2017. The disclosures of the aforementioned applications are hereby incorporated by reference in their entireties.

TECHNICAL FIELD

This application relates to the field of wireless communications technologies, and in particular, to an uplink power control method and a communications device.

BACKGROUND

In a Long Term Evolution (LTE) wireless communications system, when a terminal device sends data to an evolved NodeB (eNB) in a cell that the terminal device has accessed, the evolved NodeB needs to control uplink transmit power of the terminal device; and the terminal device determines the uplink transmit power of the terminal device based on power control indication information delivered by the evolved NodeB.

In a 5th Generation (5G) wireless communications system or a future wireless communications system, a radio environment is more complex and more diversified, and power control in the prior art cannot meet requirements of future mobile communications, affecting system performance.

SUMMARY

To meet requirements of future mobile communications and improve system performance, this application provides an uplink power control method and a communications device. The technical solutions are described below.

According to a first aspect, an embodiment of this application provides an uplink power control method, including: receiving, by a terminal device, power control indication information sent by a network device, where the power control indication information indicates a first power offset set, and the first power offset set is any one of at least two power offset sets; receiving, by the terminal device, a transmit power control TPC command sent by the network device, where the TPC indicates a first offset in the first power offset set; and determining, by the terminal device, uplink transmit power based on the first offset. Because impact of cross interference is considered in determining the uplink transmit power, the method can meet requirements of future mobile communications and improve system performance.

In a possible implementation, the receiving, by a terminal device, power control indication information sent by a network device includes: receiving, by the terminal device, a radio resource control RRC message sent by the network device, where the RRC message carries the power control indication information. The power control indication information is carried in the RRC message, so that the RRC message can be effectively utilized, to reduce signaling overheads.

In a possible implementation, the receiving, by a terminal device, power control indication information sent by a network device includes: receiving, by the terminal device, downlink control information DCI sent by the network device, where the DCI carries the power control indication information. The power control indication information is carried in the DCI, so that the DCI message can be effectively utilized, to reduce signaling overheads.

In a possible implementation, a preset bit of the TPC indicates the power control indication information. The power control indication information is carried in preset bit information of the TPC, so that the TPC can be effectively utilized, to reduce signaling overheads.

In a possible implementation, the at least two power offset sets are determined by the network device based on at least two interference intensity levels of cross interference of the terminal device to another terminal device, the cross interference is interference caused by uplink transmission of the terminal device to downlink reception of the another terminal device, a cell on which the terminal device camps is a serving cell, and a cell on which the another terminal device camps is a neighboring cell of the serving cell. Cross interference between the terminal device and another terminal device is considered. Therefore, at least two power offset sets are configured. During uplink power control, the terminal device determines, based on the first power control indication information, the first power offset set indicated by the first power control indication information from the at least two power offset sets; and then determines the uplink transmit power according to the foregoing method. This alleviates the cross interference to the another terminal device.

In a possible implementation, the determining, by the terminal device, uplink transmit power based on the first offset includes: obtaining, by the terminal device, a transmit power adjustment amount based on the first offset; and determining, by the terminal device, the uplink transmit power based on the adjustment amount. A specific implementation of determining the uplink transmit power based on the first offset may include the following several manners.

In a possible implementation, the method further includes: determining, by the terminal device, maximum transmit power $P_{CMAX,c}$ of the terminal device, transmit power $P_{o\_PUSCH}$ that the network device expects to receive and that is of a physical uplink shared channel, a downlink path loss estimate $PL_c$, a quantity $M_{PUSCH,c}$ of resource blocks RBs allocated by the network device to the terminal device during transmission of the physical uplink shared channel, a path loss compensation factor $\alpha_c$, and an offset $\Delta_{TF,\ c}$ related to a modulation and coding scheme MCS; and the determining, by the terminal device, the uplink transmit power based on the adjustment amount includes: determining, by the terminal device, transmit power of the physical uplink shared channel based on $P_{CMAX,c}$, $P_{o\_PUSCH}$, $PL_c$, $M_{PUSCH,c}$, $\alpha_c$, $\Delta_{TF,\ c}$, and the adjustment amount. The transmit power of the physical uplink shared channel is determined based on not only the adjustment amount but also $P_{CMAX,c}$, $P_{o\_PUSCH}$, $PL_c$, $M_{PUSCH,c}$, $\alpha_c$, and $\Delta_{TF,\ c}$, so that the determined transmit power of the physical uplink shared channel is more accurate.

In a possible implementation, the method further includes:

determining, by the terminal device, maximum transmit power $P_{CMAX,c}$ of the terminal device, transmit power $P_{o\_PUCCH}$ that the network device expects to receive and that is of a physical uplink control channel, a downlink path loss estimate $PL_c$, a first power parameter value $h(n_{CQI}, n_{HARQ}, n_{SR})$, a second power parameter value $\Delta_{F\_PUCCH}(F)$ that is configured by the network device for the terminal device and that is of the physical uplink control channel, and a third power parameter value $\Delta_{TxD}(F')$ that is configured by the network device for the terminal device and that is of the physical uplink control channel; and the determining, by the terminal device, first uplink transmit power based on the adjustment amount includes: determining, by the terminal device, transmit power of the physical uplink control channel based on $P_{CMAX,c}$, $P_{o\_PUCCH}$, $PL_c$, $h(n_{CQI}, n_{HARQ}, n_{SR})$, $\Delta_{F\_PUCCH}(F)$, and $\Delta_{TxD}(F')$, and the adjustment amount. The transmit power of the physical uplink control channel is determined based on not only the adjustment amount but also $P_{CMAX,c}$, $P_{o\_PUCCH}$, $PL_c$, $h(n_{CQI}, n_{HARQ}, n_{SR})$, $\Delta_{F\_PUCCH}(F)$, and $\Delta_{TxD}(F')$, so that the determined transmit power of the physical uplink control channel is more accurate.

According to a second aspect, an embodiment of this application further provides an uplink power control method, including:

determining, by a network device, power control indication information, and determining a transmit power control TPC command, where the power control indication information indicates a first power offset set, the first power offset set is any one of at least two power offset sets, and the TPC indicates a first offset in the first power offset set; and sending, by the network device, the power control indication information to a terminal device, and sending the TPC to the terminal device, where the power control indication information and the TPC are used by the terminal device to determine the first offset and determine uplink transmit power based on the first offset.

In this embodiment of this application, because impact of cross interference is considered in determining the uplink transmit power, the method can meet requirements of future mobile communications and improve system performance.

In a possible implementation, the sending, by the network device, the power control indication information to a terminal device includes:

sending, by the network device, a radio resource control RRC message to the terminal device, where the RRC message carries the power control indication information.

In this embodiment of this application, the power control indication information is carried in the RRC message, so that the RRC message can be effectively utilized, to reduce signaling overheads.

In a possible implementation, the sending, by the network device, the power control indication information to a terminal device includes:

sending, by the network device, downlink control information DCI to the terminal device, where the DCI carries the power control indication information.

In this embodiment of this application, the power control indication information is carried in the DCI, so that the DCI message can be effectively utilized, to reduce signaling overheads.

In a possible implementation, a preset bit of the TPC indicates the power control indication information.

In this embodiment of this application, the power control indication information is carried in preset bit information of the TPC, so that the TPC can be effectively utilized, to reduce signaling overheads.

In a possible implementation, the at least two power offset sets are determined by the network device based on at least two interference intensity levels of cross interference of the terminal device to another terminal device, the cross interference is interference caused by uplink transmission of the terminal device to downlink reception of the another terminal device, a cell on which the terminal device camps is a serving cell, and a cell on which the another terminal device camps is a neighboring cell of the serving cell.

In this embodiment of this application, cross interference between the terminal device and another terminal device is considered. Therefore, at least two power offset sets are configured. During uplink power control, the terminal device determines, based on the first power control indication information, the first power offset set indicated by the first power control indication information from the at least two power offset sets; and then determines the uplink transmit power according to the foregoing method. This alleviates the cross interference to the another terminal device.

In a possible implementation, the determining, by a network device, power control indication information includes:

receiving, by the network device, interactive information sent by a network device in a neighboring cell, and determining the power control indication information based on the interactive information, where the interactive information includes resource scheduling information.

In this embodiment of this application, the power control indication information is determined based on the resource scheduling information of the neighboring cell. In this way, cross interference between the terminal device and another terminal device is considered, and the uplink transmit power is determined according to the foregoing method. This alleviates the cross interference to the another terminal device.

In a possible implementation, the determining, by a network device, power control indication information includes:

receiving, by the network device, cross interference measurement report information sent by the terminal device, and determining the power control indication information based on the cross interference measurement report information, where the report information indicates an intensity level of cross interference caused by uplink transmission of the terminal device to downlink reception of another terminal device, and the intensity level of the cross interference is determined by the terminal device based on reference signal received power (RSRP) of a sensing signal or measurement signal that is sent between the terminal device and the another terminal device.

According to a third aspect, an embodiment of this application further provides an uplink power control method, including: receiving, by a terminal device, power control indication information sent by a network device, where the power control indication information indicates a second offset; receiving, by the terminal device, a transmit power control TPC command sent by the network device, where the TPC indicates a first offset; and determining, by the terminal device, uplink transmit power based on the first offset and the second offset. Because impact of cross interference is considered in determining the uplink transmit power, the method can meet requirements of future mobile communications and improve system performance.

In a possible implementation, the receiving, by a terminal device, power control indication information sent by a network device includes: receiving, by the terminal device, a radio resource control RRC message sent by the network device, where the RRC message carries the power control indication information. The power control indication information is carried in the RRC message, so that the RRC message can be effectively utilized, to reduce signaling overheads.

In a possible implementation, the receiving, by a terminal device, power control indication information sent by a network device includes: receiving, by the terminal device, downlink control information DCI sent by the network device, where the DCI carries the power control indication information. The power control indication information is carried in the DCI, so that the DCI can be effectively utilized, to reduce signaling overheads.

In a possible implementation, the power control indication information includes first power control indication information and second power control indication information; and correspondingly, the receiving, by a terminal device, power control indication information sent by a network device, where the power control indication information indicates a second offset includes:

receiving, by the terminal device, an RRC message sent by the network device, where the RRC message carries the first power control indication information, the first power control indication information indicates a second power offset set, and the second power offset set includes at least one second offset; and receiving, by the terminal device, DCI sent by the network device, where the DCI carries the second power control indication information, and the second power control indication information indicates the second offset in the second power offset set. The first power control indication information is carried in the RRC message, and the second power control indication information is carried in the DCI, so that the RRC message and the DCI can be effectively utilized, to reduce signaling overheads.

In a possible implementation, the second offset is determined by the network device based on a cross interference intensity level of cross interference of the terminal device to another terminal device, the cross interference is interference caused by uplink transmission of the terminal device to downlink reception of the another terminal device, a cell on which the terminal device camps is a serving cell, and a cell on which the another terminal device camps is a neighboring cell of the serving cell.

In a possible implementation, the determining, by the terminal device, uplink transmit power based on the first offset and the second offset includes: obtaining, by the terminal device, a transmit power adjustment amount based on the first offset; and determining, by the terminal device, the uplink transmit power based on the adjustment amount and the second offset. Because the uplink transmit power is determined based on both the adjustment amount and the second offset, the determined uplink transmit power is more accurate.

According to a fourth aspect, an embodiment of this application further provides an uplink power control method, including:

determining, by a network device, power control indication information, and determining a transmit power control TPC command, where the power control indication information indicates a second offset; and sending, by the network device, the power control indication information to a terminal device, and sending the TPC to the terminal device, where the TPC indicates a first offset, and the first offset and the second offset are used by the terminal device to determine uplink transmit power.

In this embodiment of this application, because impact of cross interference is considered in determining the uplink transmit power, the method can meet requirements of future mobile communications and improve system performance.

In a possible implementation, the sending, by the network device, the power control indication information to a terminal device includes:

sending, by the network device, a radio resource control RRC message to the terminal device, where the RRC message carries the power control indication information.

In this embodiment of this application, the power control indication information is carried in the RRC message, so that the RRC message can be effectively utilized, to reduce signaling overheads.

In a possible implementation, the sending, by the network device, the power control indication information to a terminal device includes:

sending, by the network device, downlink control information DCI to the terminal device, where the DCI carries the power control indication information.

In this embodiment of this application, the power control indication information is carried in the DCI, so that the DCI can be effectively utilized, to reduce signaling overheads.

In a possible implementation, the power control indication information includes first power control indication information and second power control indication information; and the sending, by the network device, the power control indication information to a terminal device includes:

sending, by the network device, an RRC message to the terminal device, where the RRC message carries the first power control indication information, the first power control indication information indicates a second power offset set, and the second power offset set includes at least one second offset; and sending, by the network device, DCI to the terminal device, where the DCI carries the second power control indication information, and the second power control indication information indicates the second offset in the second power offset set.

In this embodiment of this application, the first power control indication information is carried in the RRC message, and the second power control indication information is carried the DCI, so that the RRC message and the DCI can be effectively utilized, to reduce signaling overheads.

In a possible implementation, the second offset is determined by the network device based on a cross interference intensity level of cross interference of the terminal device to another terminal device, the cross interference is interference caused by uplink transmission of the terminal device to downlink reception of the another terminal device, a cell on which the terminal device camps is a serving cell, and a cell on which the another terminal device camps is a neighboring cell of the serving cell.

In a possible implementation, the determining, by a network device, power control indication information includes:

obtaining, by the network device, an interference intensity level of cross interference, and obtaining the power control indication information based on the interference intensity level.

In this embodiment of this application, the network device determines the power control indication information based on the intensity level of the cross interference, so that the determined power control indication information is more accurate.

According to a fifth aspect, an embodiment of this application further provides an uplink power control apparatus. The apparatus includes:

a receiving module, configured to receive power control indication information sent by a network device, where the power control indication information indicates a first power offset set, and the first power offset set is any one of at least two power offset sets, where the receiving module is further configured to receive a transmit power control TPC command sent by the network device, where the TPC indicates a first offset in the first power offset set; and a processing module, configured to determine uplink transmit power based on the first offset.

In a possible implementation, the receiving module is further configured to receive a radio resource control RRC message sent by the network device, where the RRC message carries the power control indication information.

In a possible implementation, the receiving module is further configured to receive downlink control information DCI sent by the network device, where the DCI carries the power control indication information.

In a possible implementation, a preset bit of the TPC indicates the power control indication information.

In a possible implementation, the at least two power offset sets are determined by the network device based on at least two interference intensity levels of cross interference of the terminal device to another terminal device, the cross interference is interference caused by uplink transmission of the terminal device to downlink reception of the another terminal device, a cell on which the terminal device camps is a serving cell, and a cell on which the another terminal device camps is a neighboring cell of the serving cell.

In a possible implementation, the processing module is further configured to: obtain a transmit power adjustment amount based on the first offset, and determine the uplink transmit power based on the adjustment amount.

In a possible implementation, the processing module is further configured to determine maximum transmit power $P_{CMAX,c}$ of the terminal device, transmit power $P_{o\_PUSCH}$ that the network device expects to receive and that is of a physical uplink shared channel, a downlink path loss estimate $PL_c$, a quantity $M_{PUSCH,c}$ of resource blocks RBs allocated by the network device to the terminal device during transmission of the physical uplink shared channel, a path loss compensation factor $\alpha_c$, and an offset $\Delta_{TF,c}$ related to a modulation and coding scheme MCS; and the processing module is further configured to determine transmit power of the physical uplink shared channel based on $P_{CMAX,c}$, $P_{o\_PUSCH}$, $PL_c$, $M_{PUSCH,c}$, $\alpha_c$, $\Delta_{TF,c}$, and the adjustment amount.

In a possible implementation, the processing module is further configured to determine maximum transmit power $P_{CMAX,c}$ of the terminal device, transmit power $P_{o\_PUCCH}$ that the network device expects to receive and that is of a physical uplink control channel, a downlink path loss estimate $PL_c$, a first power parameter value $h(n_{CQI}, n_{HARQ}, n_{SR})$, a second power parameter value $\Delta_{F\_PUCCH}(F)$ that is configured by the network device for the terminal device and that is of the physical uplink control channel, and a third power parameter value $\Delta_{TxD}(F')$ that is configured by the network device for the terminal device and that is of the physical uplink control channel; and the processing module is further configured to determine transmit power of the physical uplink control channel based on $P_{CMAX,c}$, $P_{o\_PUCCH}$, $PL_c$, $h(n_{CQI}, n_{HARQ}, n_{SR})$, $\Delta_{F\_PUCCH}(F)$, $\Delta_{TxD}(F')$, and the adjustment amount.

According to a sixth aspect, an embodiment of this application further provides an uplink power control apparatus. The apparatus includes:

a processing module, configured to: determine power control indication information, and determine a transmit power control TPC command, where the power control indication information indicates a first power offset set, the first power offset set is any one of at least two power offset sets, and the TPC indicates a first offset in the first power offset set; and a sending module, configured to: send the power control indication information to a terminal device, and send the TPC to the terminal device, where the power control indication information and the TPC are used by the terminal device to determine the first offset and determine uplink transmit power based on the first offset.

In a possible implementation, the sending module is further configured to send a radio resource control RRC message to the terminal device, where the RRC message carries the power control indication information.

In a possible implementation, the sending module is further configured to send downlink control information DCI to the terminal device, where the DCI carries the power control indication information.

In a possible implementation, a preset bit of the TPC indicates the power control indication information.

In a possible implementation, the at least two power offset sets are determined by the network device based on at least two interference intensity levels of cross interference of the terminal device to another terminal device, the cross interference is interference caused by uplink transmission of the terminal device to downlink reception of the another terminal device, a cell on which the terminal device camps is a serving cell, and a cell on which the another terminal device camps is a neighboring cell of the serving cell.

In a possible implementation, the apparatus further includes:

a receiving module, configured to receive interactive information sent by a network device in a neighboring cell, where the processing module is further configured to determine the power control indication information based on the interactive information, where the interactive information includes resource scheduling information.

In a possible implementation, the receiving module is further configured to receive cross interference measurement report information sent by the terminal device; and the processing module is further configured to determine the power control indication information based on the cross interference measurement report information, where the report information indicates an intensity level of cross interference caused by uplink transmission of the terminal device to downlink reception of another terminal device, and the intensity level of the cross interference is determined by the terminal device based on reference signal received power (RSRP) of a sensing signal or measurement signal that is sent between the terminal device and the another terminal device.

According to a seventh aspect, an embodiment of this application further provides an uplink power control apparatus. The apparatus includes:

a receiving module, configured to receive power control indication information sent by a network device, where the power control indication information indicates a second offset, where the receiving module is further configured to receive a transmit power control TPC command sent by the network device, where the TPC indicates a first offset; and a processing module, configured to determine uplink transmit power based on the first offset and the second offset.

In a possible implementation, the receiving module is further configured to receive a radio resource control RRC message sent by the network device, where the RRC message carries the power control indication information.

In a possible implementation, the receiving module is further configured to receive downlink control information DCI sent by the network device, where the DCI carries the power control indication information.

In a possible implementation, the power control indication information includes first power control indication information and second power control indication information;

the receiving module is further configured to receive an RRC message sent by the network device, where the RRC message carries the first power control indication information, the first power control indication information indicates a second power offset set, and the second power offset set includes at least one second offset; and the receiving module is further configured to receive DCI sent by the network device, where the DCI carries the second power control indication information, and the second power control indication information indicates the second offset in the second power offset set.

In a possible implementation, the second offset is determined by the network device based on a cross interference intensity level of cross interference of the terminal device to another terminal device, the cross interference is interference caused by uplink transmission of the terminal device to downlink reception of the another terminal device, a cell on which the terminal device camps is a serving cell, and a cell on which the another terminal device camps is a neighboring cell of the serving cell.

In a possible implementation, the processing module is further configured to: obtain a transmit power adjustment amount based on the first offset, and determine the uplink transmit power based on the adjustment amount and the second offset.

According to an eighth aspect, an embodiment of this application further provides an uplink power control apparatus. The apparatus includes:

a processing module, configured to: determine power control indication information, and determine a transmit power control TPC command, where the power control indication information indicates a second offset; and a sending module, configured to: send the power control indication information to a terminal device, and send the TPC to the terminal device, where the TPC indicates a first offset, and the first offset and the second offset are used by the terminal device to determine uplink transmit power.

In a possible implementation, the sending module is further configured to send a radio resource control RRC message to the terminal device, where the RRC message carries the power control indication information.

In a possible implementation, the sending module is further configured to send downlink control information DCI to the terminal device, where the DCI carries the power control indication information.

In a possible implementation, the power control indication information includes first power control indication information and second power control indication information;

the sending module is further configured to send an RRC message to the terminal device, where the RRC message carries the first power control indication information, the first power control indication information indicates a second power offset set, and the second power offset set includes at least one second offset; and the sending module is further configured to send DCI to the terminal device, where the DCI carries the second power control indication information, and the second power control indication information indicates the second offset in the second power offset set.

In a possible implementation, the second offset is determined by the network device based on a cross interference intensity level of cross interference of the terminal device to another terminal device, the cross interference is interference caused by uplink transmission of the terminal device to downlink reception of the another terminal device, a cell on which the terminal device camps is a serving cell, and a cell on which the another terminal device camps is a neighboring cell of the serving cell.

In a possible implementation, the processing module is further configured to: obtain an interference intensity level of cross interference, and obtain the power control indication information based on the interference intensity level.

According to a ninth aspect, an embodiment of this application further provides a communications device. The communications device implements functions of the terminal device in the example uplink power control method according to the first aspect or any possible implementation of the first aspect. The functions may be implemented by hardware, or may be implemented by hardware executing corresponding software. The hardware or the software includes one or more modules corresponding to the functions. For example, the communications device may include a receiver and a processor, and may further include a transmitter.

According to a tenth aspect, an embodiment of this application further provides a communications device. The communications device implements functions of the terminal device in the example uplink power control method according to the second aspect or any possible implementation of the second aspect. The functions may be implemented by hardware, or may be implemented by hardware executing corresponding software. The hardware or the software includes one or more modules corresponding to the functions. For example, the communications device may include a receiver and a processor, and may further include a transmitter.

According to an eleventh aspect, an embodiment of this application further provides a communications device. The communications device implements functions of the terminal device in the example uplink power control method according to the third aspect or any possible implementation of the third aspect. The functions may be implemented by hardware, or may be implemented by hardware executing corresponding software. The hardware or the software includes one or more modules corresponding to the functions. For example, the communications device may include a receiver and a processor, and may further include a transmitter.

According to a twelfth aspect, an embodiment of this application further provides a communications device. The communications device implements functions of the terminal device in the example uplink power control method according to the fourth aspect or any possible implementation of the fourth aspect. The functions may be implemented by hardware, or may be implemented by hardware executing corresponding software. The hardware or the software includes one or more modules corresponding to the functions. For example, the communications device may include a receiver and a processor, and may further include a transmitter.

According to a thirteenth aspect, an embodiment of this application provides a computer storage medium, configured to store a computer software instruction used in the communications device according to the ninth aspect or any possible implementation of the ninth aspect, where the computer software instruction includes a program designed to perform the foregoing aspect.

According to a fourteenth aspect, an embodiment of this application provides a computer storage medium, configured to store a computer software instruction used in the communications device according to the tenth aspect or any possible implementation of the tenth aspect, where the computer software instruction includes a program designed to perform the foregoing aspect.

According to a fifteenth aspect, an embodiment of this application provides a computer storage medium, configured to store a computer software instruction used in the communications device according to the eleventh aspect or any possible implementation of the eleventh aspect, where the computer software instruction includes a program designed to perform the foregoing aspect.

According to a sixteenth aspect, an embodiment of this application provides a computer storage medium, configured to store a computer software instruction used in the communications device according to the twelfth aspect or any possible implementation of the twelfth aspect, where the computer software instruction includes a program designed to perform the foregoing aspect.

According to a seventeenth aspect, a computer program product is provided, where the computer program product includes an instruction, and when the computer program product runs on a computer, the computer performs the method according to the first aspect or any possible implementation of the first aspect.

According to an eighteenth aspect, a computer program product is provided, where the computer program product includes an instruction, and when the computer program product runs on a computer, the computer performs the method according to the second aspect or any possible implementation of the second aspect.

According to a nineteenth aspect, a computer program product is provided, where the computer program product includes an instruction, and when the computer program product runs on a computer, the computer performs the method according to the third aspect or any possible implementation of the third aspect.

According to a twentieth aspect, a computer program product is provided, where the computer program product includes an instruction, and when the computer program product runs on a computer, the computer performs the method according to the fourth aspect or any possible implementation of the fourth aspect.

DESCRIPTION OF EMBODIMENTS

To make the objectives, technical solutions, and advantages of this application clearer, the following further describes the implementations of this application in detail with reference to the accompanying drawings.

Figure 1:
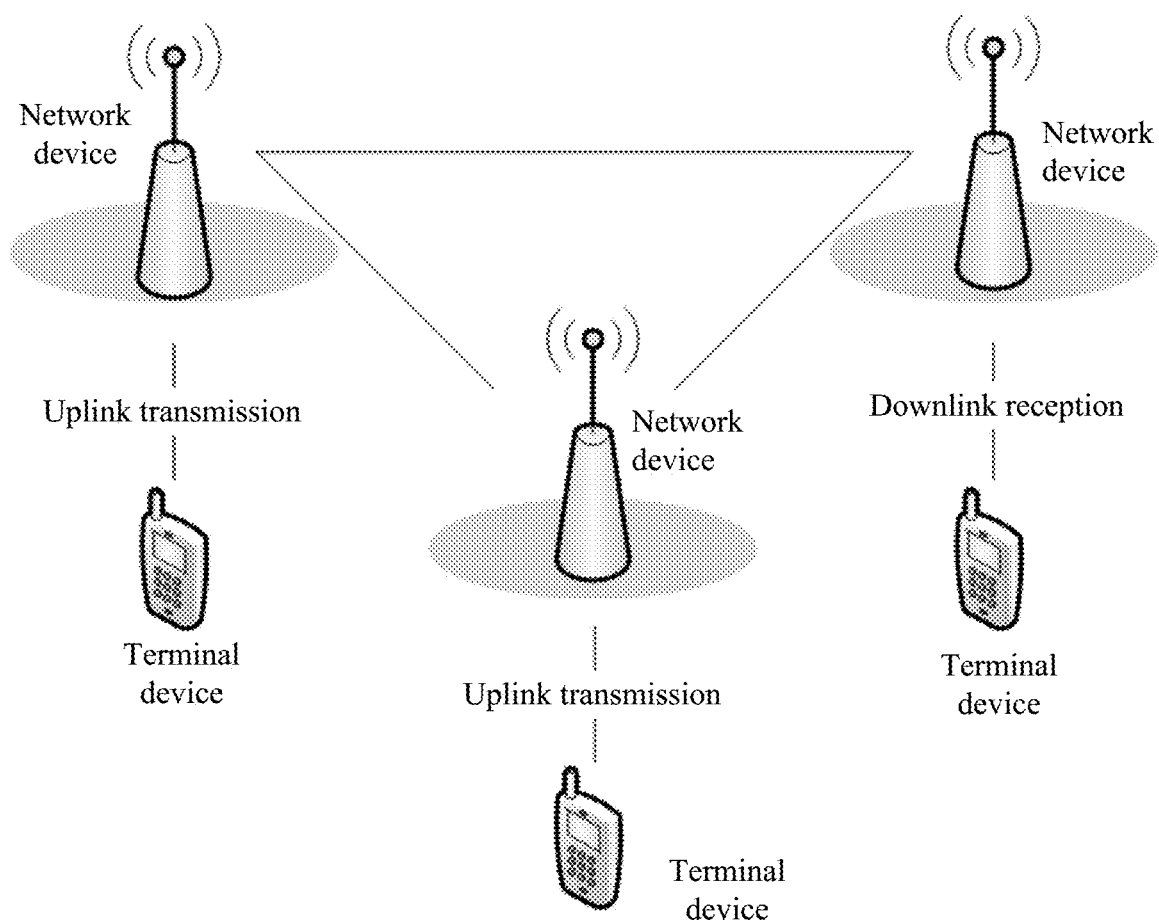
FIG. 1 is a schematic diagram of a wireless communications system according to an embodiment of this application.

FIG. 1 is a schematic diagram of a wireless communications system to which the technical solutions of the embodiments of this application are applicable.

In the solutions of the embodiments of this application, the wireless communications system shown in FIG. 1 includes network devices in at least two serving cells and at least two terminal devices.

System architectures and service scenarios described in the embodiments of this application are intended to more clearly describe the technical solutions of the embodiments of this application, but constitute no limitation on the technical solutions provided in the embodiments of this application. Specifically, the wireless communications system in the embodiments of this application may be, for example, 5G.

The network device mentioned in the embodiments of this application is a communications device deployed in a radio access network to provide a terminal device with a wireless communications function. The network device may include a macro base station, a micro base station (also referred to as a small cell), a relay node, a transmission/reception point (TRP), and the like in various forms. In systems using different radio access technologies, a name of a device having functions of the network device may vary. For ease of description, in all the embodiments of this application, the foregoing communications devices that provide the terminal device with the wireless communications function are collectively referred to as network devices.

The terminal device in the embodiments of this application may include various handheld devices, in-vehicle devices, wearable devices, or computing devices that have the wireless communications function, or another processing device connected to a wireless modem. The terminal device may also be referred to as a mobile station (MS), user equipment (UE), or terminal equipment. The terminal device may alternatively include a subscriber unit, a cellular phone, a smartphone, a wireless data card, a personal digital assistant (PDA) computer, a tablet computer, a wireless modem, a handheld device, a laptop computer, a cordless phone, a wireless local loop (WLL) station, a machine type communication (MTC) terminal device, and the like. For ease of description, in all the embodiments of this application, the devices mentioned above are collectively referred to as terminal devices.

It needs to be noted that, the quantity and type of the terminal devices included in the communications system shown in FIG. 1 are merely for an illustration purpose, and the embodiments of this application are not limited thereto.

Uplink transmission of a terminal device causes cross interference to downlink reception of another device, and the terminal device and the another device are located in different serving cells. In the prior art, the cross interference is not considered during control of uplink transmit power of the terminal device. As a result, the prior art cannot meet requirements of future mobile communications, affecting system performance.

An embodiment of this application provides an uplink power control method. In this embodiment of this application, a terminal device receives power control indication information sent by a network device, where the power control indication information indicates a first power offset set, and the first power offset set is any one of at least two power offset sets. The terminal device receives a transmit power control (TPC) command sent by the network device, determines a first offset indicated by the TPC from the first power offset set, and determines uplink transmit power based on the first offset. In this embodiment of this application, description is made by using an example in which the power control indication information is carried in a radio resource control (RRC) message.

Figure 2:
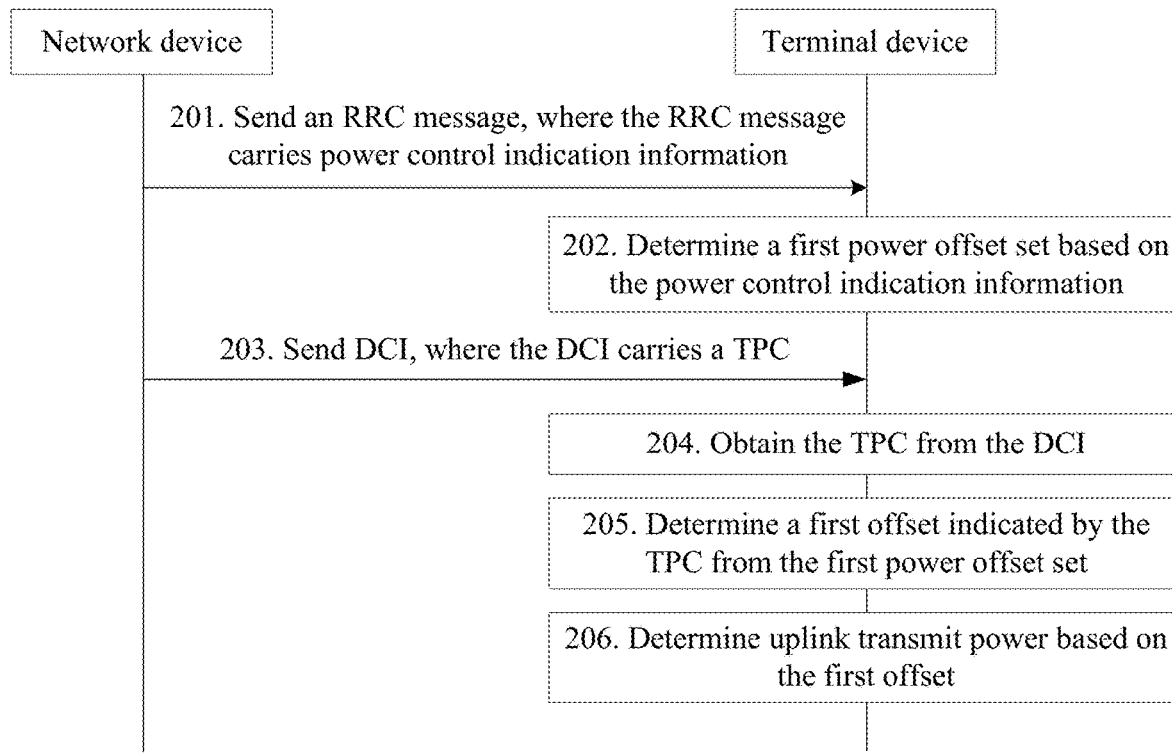
FIG. 2 is a flowchart of an uplink power control method according to an embodiment of this application.

As shown in FIG. 2, the method includes the following steps.

Step 201: A network device determines power control indication information, and sends an RRC message to a terminal device, where the RRC message carries the power control indication information, the power control indication information indicates a first power offset set, and the first power offset set is any one of at least two power offset sets.

The at least two power offset sets are determined by the network device based on at least two interference intensity levels of cross interference of the terminal device to another terminal device, the cross interference is interference caused by uplink transmission of the terminal device to downlink reception of the another terminal device, a cell on which the terminal device camps is a serving cell, and a cell on which the another terminal device camps is a neighboring cell of the serving cell.

The uplink transmission of the terminal device causes the cross interference to the downlink reception of the another terminal device, and the terminal device and the another terminal device are located in different serving cells. In this embodiment of this application, the network device determines the power control indication information, adds the power control indication information to the RRC message, and sends the RRC message to the terminal device, so that when determining uplink transmit power, the terminal device selects a first offset from the power offset set indicated by the power control indication information, and determines the uplink transmit power based on the first offset. In this way, impact of the cross interference to the another terminal device is reflected in the uplink transmit power of the terminal device. This ensures transmission performance of the terminal device, and further alleviates the interference to the downlink reception of the another terminal device.

When the network device determines the power control indication information, the network device may determine the power control indication information based on information exchange between network devices, in other words, by using the following first implementation; or the network device may determine the power control indication information based on information that is reported by the terminal device, in other words, by using the following second implementation.

For the first implementation, a step in which the network device determines the power control indication information may be:

the network device receives interactive information sent by a network device in a neighboring cell, and determines the power control indication information based on the interactive information.

The interactive information includes resource scheduling information. The network device determines an interference intensity level of cross interference between the terminal device and another terminal device based on the interactive information, and determines the power control indication information based on the interference intensity level.

A step in which the network device determines the interference intensity level of the cross interference between the terminal device and the another terminal device based on the interactive information may be:

the network device obtains resource scheduling information of the terminal device, determines an overlapping ratio of scheduled resources of the terminal device to scheduled resources of the another terminal device based on the resource scheduling information of the terminal device and the resource scheduling information that is included in the interactive information, and determines the cross interference intensity level based on the overlapping ratio.

A step in which the network device determines the power control indication information based on the interference intensity level may be:

the network device obtains, from a mapping relationship between an interference intensity level and power control indication information based on the interference intensity level, power control indication information corresponding to the interference intensity level; or the network device determines, based on the interference intensity level and a transformation function, power control indication information corresponding to the interference intensity level, where the transformation function is a transformation function used to transform an interference intensity level into power control indication information; or the network device determines, based on the interference intensity level, an interference intensity level range to which the interference intensity level belongs; and obtains, from a correspondence between an interference intensity level range and power control indication information based on the interference intensity level range to which the interference intensity level belongs, power control indication information corresponding to the interference intensity level.

For the second implementation, a step in which the network device determines the power control indication information may be:

the network device receives cross interference measurement report information sent by the terminal device, and determines the power control indication information based on the cross interference measurement report information, where the report information indicates an intensity level of cross interference caused by uplink transmission of the terminal device to downlink reception of another terminal device, and the intensity level of the cross interference is determined by the terminal device based on reference signal received power (RSRP) of a sensing signal or measurement signal that is sent between the terminal device and the another terminal device.

For example, the RRC information carries P_mode, and P_mode is the power control indication information. In addition, the power control indication information is 1-bit information or multi-bit information. For example, when the power control indication information is 1 bit, P_mode carried in the RRC message may be a Boolean variable. When the power control indication information is 0, the power control indication information indicates that a TPC is located in a power offset set 0. When the power control indication information is 1, the power control indication information indicates that a TPC is located in a power offset set 1. For another example, when the power control indication information is 2 bits, the power control indication information may indicate four cases. When the power control indication information is 00, the power control indication information indicates that a TPC is located in a power offset set 0. When the power control indication information is 01, the power control indication information indicates that a TPC is located in a power offset set 1. When the power control indication information is 10, the power control indication information indicates that a TPC is located in a power offset set 3. When the power control indication information is 11, the power control indication information indicates that a TPC is located in a power offset set 4. In other words, when the power control indication information is 2 bits, the power control indication information may indicate four cases in which the TPC is located in the power offset sets 0, 1, 2, and 3 respectively.

Step 202: The terminal device receives the RRC message sent by the network device, obtains the power control indication information from the RRC message, and determines the first power offset set based on the power control indication information.

A physical uplink control channel corresponds to at least two power offset sets, and a physical uplink shared channel corresponds to at least two power offset sets. Therefore, this step may be:

if a physical uplink channel is a physical uplink control channel, the terminal device determines, from at least two power offset sets corresponding to the physical uplink control channel, the first power offset set indicated by the power control indication information; or if a physical uplink channel is a physical uplink shared channel, the terminal device determines, from at least two power offset sets corresponding to the physical uplink shared channel, the first power offset set indicated by the power control indication information.

When the terminal device determines the uplink transmit power, the network device further needs to send downlink control information (DCI) to the terminal device by performing the following step 203, where different DCI formats correspond to different power offset sets. Therefore, alternatively, the step in which the terminal device determines the first power offset set based on the power control indication information may be:

the terminal device obtains, based on a type of a physical uplink channel and a format of the DCI, at least two power offset sets corresponding to the type of the physical uplink channel and the format of the DCI; and determines, based on the power control indication information, the first power offset set indicated by the power control indication information from the at least two power offset sets corresponding to the type of the physical uplink channel and the format of the DCI.

If the physical uplink channel is a physical uplink control channel, the format of the DCI may be a format 1A/1B/1D/1/2A/2B/2C/2D/2/3, or a format 3A; or if the physical uplink channel is a physical uplink shared channel, the format of the DCI may be a format 0/3/4, or a format 3A.

In this embodiment of this application, description is made by using an example in which there are only two cases for P_mode. There may be four, eight, or even more cases for P_mode.

For example, if the physical uplink channel is a physical uplink control channel and the format of the DCI is the format 1A/1B/1D/1/2A/2B/2C/2D/2/3, the at least two power offset sets are shown in Table 1 below.

TABLE 1

| TPC | P_mode = 0<br>Power offset | P_mode = 1<br>Power offset |
| --- | --- | --- |
| 0 | −1 | −4 |
| 1 | 0 | −3 |
| 2 | 1 | −2 |
| 3 | 3 | 0 |

When the physical uplink channel is a physical uplink control channel and the format of the DCI is the format 1A/1B/1D/1/2A/2B/2C/2D/2/3, if P_mode is 0, the terminal device selects a power offset set in the first column based on the power control indication information; or if P_mode is 1, the terminal device selects a power offset set in the second column based on the power control indication information.

For another example, if the physical uplink channel is a physical uplink control channel and the format of the DCI is the format 3A, the at least two power offset sets are shown in Table 2 below.

TABLE 2

| TPC | P_mode = 0<br>Power offset | P_mode = 1<br>Power offset |
| --- | --- | --- |
| 0 | −1 | −4 |
| 1 | 1 | −3 |

When the physical uplink channel is a physical uplink control channel and the format of the DCI is the format 3A, if P_mode is 0, the terminal device selects a power offset set in the first column based on the power control indication information; or if P_mode is 1, the terminal device selects a power offset set in the second column based on the power control indication information.

For another example, if the physical uplink channel is a physical uplink shared channel and the format of the DCI is the format 3A, the at least two power offset sets are shown in Table 3 below.

TABLE 3

| TPC | P_mode = 0<br>Power offset | P_mode = 1<br>Power offset |
| --- | --- | --- |
| 0 | −1 | −4 |
| 1 | 1 | −2 |

When the physical uplink channel is a physical uplink shared channel and the format of the DCI is the format 3A, if P_mode is 0, the terminal device selects a power offset set in the first column based on the power control indication information; or if P_mode is 1, the terminal device selects a power offset set in the second column based on the power control indication information.

When the physical uplink channel is a physical uplink shared channel and the format of the DCI is the format 0/3/4, different offset calculation modes correspond to different power offset sets. Therefore, if the physical uplink channel is a physical uplink shared channel and the format of the DCI is the format 0/3/4, alternatively, the step in which the terminal device determines the first power offset set based on the power control indication information may be:

the terminal device determines, based on the power control indication information and an offset calculation mode, a first power offset set corresponding to the power control indication information and the offset calculation mode from the at least two power offset sets.

The offset calculation mode may be an accumulated mode or an absolute mode.

For example, if the physical uplink channel is a physical uplink shared channel and the format of the DCI is the format 0/3/4, the at least two power offset sets are shown in Table 4 below.

TABLE 4

| TPC | P_mode = 0 Power offset set in the accumulated mode | P_mode = 1 Power offset set in the absolute mode | P_mode = 0 Power offset set in the accumulated mode | P_mode = 1 Power offset set in the absolute mode |
|---|---|---|---|---|
| 0 | −1 | −4 | −4 | −7 |
| 1 | 0 | −1 | −3 | −4 |
| 2 | 1 | 1 | −2 | −2 |
| 3 | 3 | 4 | 0 | 1 |

When the offset calculation mode is the accumulated mode and the power control indication information is 0, the terminal device selects a power offset set in the first column; or when the offset calculation mode is the accumulated mode and the power control indication information is 1, the terminal device selects a power offset set in the third column; or when the offset calculation mode is the absolute mode and the power control indication information is 0, the terminal device selects a power offset set in the second column; or when the offset calculation mode is the absolute mode and the power control indication information is 1, the terminal device selects a power offset set in the fourth column.

Step 203: The network device determines a TPC and sends DCI to the terminal device, where the DCI carries the TPC, and the TPC indicates a first offset in the first power offset set.

The network device adds the TPC to the DCI and sends the DCI to the terminal device, and then step 204 is performed.

It needs to be noted that there is no strict time sequence for step 201 and step 203. Step 201 and step 202 may be performed before step 203 and step 204; or step 203 and step 204 may be performed before step 201 and step 202. In this embodiment of this application, an execution time sequence of step 201 and step 203 is not specifically limited.

Step 204: The terminal device receives the DCI sent by the network device, and obtains the TPC from the DCI.

Step 205: The terminal device determines, based on the TPC, the first offset indicated by the TPC from the first power offset set.

The first power offset set stores a correspondence between a TPC and an offset; and correspondingly, this step may be: the terminal device determines, from the correspondence between a TPC and an offset based on the TPC, a first offset corresponding to the TPC.

Step 206: The terminal device determines uplink transmit power based on the first offset.

This step may be implemented by the following steps 2061 and 2062.

2061: The terminal device obtains a transmit power adjustment amount based on the first offset.

The terminal device obtains the transmit power adjustment amount based on the offset calculation mode and the first offset.

The offset calculation mode may be the absolute mode or the accumulated mode. Then, a step in which the terminal device obtains the transmit power adjustment amount based on the offset calculation mode and the first offset may be:

if the offset calculation mode is the absolute mode, the terminal device uses the first offset as the transmit power adjustment amount; or if the offset calculation mode is the accumulated mode, the terminal device obtains an adjustment amount of a previous uplink transmission timeslot, and uses a sum of the adjustment amount of the previous uplink transmission timeslot and the first offset as the transmit power adjustment amount.

For example, if control information is transmitted between the terminal device and the network device through a physical uplink control channel, the offset (P_CLI) is −3 dB; and when the offset calculation mode is the absolute mode, the transmit power adjustment amount $g(i)=P\_CLI=-3$ dB.

For another example, if data information is transmitted between the terminal device and the network device through a physical uplink shared channel, the offset (P_CLI) is −3 dB; and when the offset calculation mode is the absolute mode, the transmit power adjustment amount $f(i)=P\_CLI=-3$ dB; or when the offset calculation mode is the accumulated mode, the transmit power adjustment amount $f(i)=f(i-1)+P\_CLI=f(i-1)-3$ dB.

2062: The terminal device determines the uplink transmit power based on the adjustment amount.

If control information is transmitted between the terminal device and the network device through a physical uplink control channel and the format of the DCI is the format 1A/1B/1D/1/2A/2B/2C/2D/2/3, transmit power of the physical uplink control channel may be determined in the following first manner in this step; or if control information is transmitted between the terminal device and the network device through a physical uplink control channel and the format of the DCI is a format 4/5, transmit power of the physical uplink control channel may be determined in the following second manner in this step; or if data information is transmitted between the terminal device and the network device through a physical uplink shared channel, transmit power of the physical uplink shared channel may be determined in the following third manner in this step; or if data information is transmitted between the terminal device and the network device through a physical uplink shared channel, and control information is transmitted between the terminal device and the network device through a physical uplink control channel, transmit power of the physical uplink shared channel may be determined in the following fourth manner in this step. If sounding reference signal (SRS) information is transmitted between the terminal device and the network device through an SRS channel, this step may be implemented in the following fifth manner.

For the first implementation, when the terminal device determines the uplink transmit power based on the adjustment amount, the terminal device further needs to obtain maximum transmit power $P_{CMAX,c}(i)$ of the terminal device, transmit power $P_{o\_PUCCH}$ that the network device expects to receive and that is of a physical uplink control channel, a downlink path loss estimate $PL_c$, a first power parameter value $h(n_{CQI}, n_{HARQ}, n_{SR})$ corresponding to a third preset format, a second power parameter value $\Delta_{F\_PUCCH}(F)$ that is configured by the network device for the terminal device and that is of the physical uplink control channel, and a third power parameter value $\Delta_{TxD}(F')$ that is configured by the network device for the terminal device and that is of the physical uplink control channel; and correspondingly, the step in which the terminal device determines the uplink transmit power based on the adjustment amount may be:

the terminal device determines transmit power of the physical uplink control channel based on $P_{CMAX,c}(i)$, $P_{o\_PUCCH}$, $PL_c$, $h(n_{CQI}, n_{HARQ}, n_{SR})$, $\Delta_{F\_PUCCH}(F)$, $\Delta_{TxD}(F')$, and the adjustment amount.

It needs to be noted that, in this embodiment of this application, the terminal device determines the transmit power of the physical uplink control channel based on at least $P_{CMAX,c}(i)$, $P_{o\_PUCCH}$, $PL_c$, $h(n_{CQI}, n_{HARQ}, n_{SR})$, $\Delta_{F\_PUCCH}(F)$, $\Delta_{TxD}(F')$, and the adjustment amount. Alternatively, the terminal device may determine the transmit power of the physical uplink control channel in combination with another power control parameter. In addition, in this embodiment of this application, a specific calculation formula used by the terminal device to determine the transmit power of the physical uplink control channel based on $P_{CMAX,c}(i)$, $P_{o\_PUCCH}$, $PL_c$, $h(n_{CQI}, n_{HARQ}, n_{SR})$, $\Delta_{F\_PUCCH}(F)$, $\Delta_{TxD}(F')$, and the adjustment amount is not specifically limited. For example, the terminal device determines the transmit power of the physical uplink control channel based on $P_{CMAX,c}(i)$, $P_{o\_PUCCH}$, $PL_c$, $h(n_{CQI}, n_{HARQ}, n_{SR})$, $\Delta_{F\_PUCCH}(F)$, $\Delta_{TxD}(F')$, and the adjustment amount by using a formula 1 below.

$$P_{PUCCH}(i) = \min\begin{cases} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{cases}, \quad \text{Formula 1}$$

where $P_{PUCCH}(i)$ is the transmit power of the physical uplink control channel, and $g(i)$ is the adjustment amount.

It needs to be noted that, when the terminal device is configured to transmit a physical uplink control channel on two antenna ports, $\Delta_{TxD}(F')$ is configured by using a higher layer parameter; and in other cases, $\Delta_{TxD}(F')=0$. $n_{CQI}$ is an information bit of channel quality information (CQI). $n_{SR}=1$ or $n_{SR}=0$. In addition, when an $i^{th}$ transmission subframe is configured only to transmit data for a physical uplink control channel of the terminal device, $n_{SR}=1$; and in other cases, $n_{SR}=0$. $n^{HARQ}$ is a parameter related to hybrid automatic repeat request-acknowledgement message (HARQ-ACK) bits.

$P_{o\_PUCCH} = P_{o\_UE\_PUCCH} + P_{o\_NOMINAL\_PUCCH}$, where $P_{o\_UE\_PUCCH}$ is a specific power parameter that is of the terminal device and that is configured by using higher layer signaling, and $P_{o\_NOMINAL\_PUCCH}$ is a specific power parameter that is of a first cell and that is configured by using higher layer signaling.

For the second implementation, when the terminal device determines the uplink transmit power based on the adjustment amount, the terminal device further needs to obtain maximum transmit power $P_{CMAX,c}(i)$ of the terminal device, transmit power $P_{o\_PUCCH}$ that the network device expects to receive and that is of a physical uplink control channel, a downlink path loss estimate $PL_c$, a quantity $M_{PUSCH,c}(i)$ of resource blocks (RB) allocated by the network device to the terminal device during transmission of the physical uplink control channel, an offset $\Delta_{TF,\,c}(i)$ related to a modulation and coding scheme (MCS), and a second power parameter value $\Delta_{F\_PUCCH}(F)$ that is configured by the network device for the terminal device and that is of the physical uplink control channel; and correspondingly, the step in which the terminal device determines the uplink transmit power based on the adjustment amount may be:

the terminal device determines transmit power of the physical uplink control channel based on $P_{CMAX,c}(i)$, $P_{o\_PUCCH}$, $PL_c$, $M_{PUCCH,c}(i)$, $\Delta_{TF,\,c}(i)$, $\Delta_{F\_PUCCH}(F)$, and the adjustment amount.

It needs to be noted that, in this embodiment of this application, the terminal device determines the transmit power of the physical uplink control channel based on at least $P_{CMAX,c}(i)$, $P_{o\_PUCCH}$, $PL_c$, $M_{PUCCH,c}(i)$, $\Delta_{TF,\,c}(i)$, $\Delta_{F\_PUCCH}(F)$, and the adjustment amount. Alternatively, the terminal device may determine the transmit power of the physical uplink control channel in combination with another power control parameter. In addition, in this embodiment of this application, a specific calculation formula used by the terminal device to determine the transmit power of the physical uplink control channel based on $P_{CMAX,c}(i)$, $P_{o\_PUCCH}$, $PL_c$, $M_{PUCCH,c}(i)$, $\Delta_{TF,\,c}(i)$, $\Delta_{F\_PUCCH}(F)$, and the adjustment amount is not specifically limited. For example, the terminal device determines the transmit power of the physical uplink control channel based on $P_{CMAX,c}(i)$, $P_{o\_PUCCH}$, $PL_c$, $M_{PUCCH,c}(i)$, $\Delta_{TF,\,c}(i)$, $\Delta_{F\_PUCCH}(F)$, and the adjustment amount by using a formula 2 below.

$$P_{PUCCH}(i) = \min\begin{cases} P_{CMAX,c}(i), \\ P_{0\_PUCCH} + PL_c + 10\log_{10}(M_{PUCCH,c}(i)) + \\ \Delta_{TF,c}(i) + \Delta_{F\_PUCCH}(F) + g(i) \end{cases}, \quad \text{Formula 2}$$

where $P_{PUCCH}(i)$ is the transmit power of the physical uplink control channel, $g(i)$ is the adjustment amount, and $i$ is a subframe identifier.

For the third implementation, when the terminal device determines the uplink transmit power based on the adjustment amount, the terminal device further needs to obtain maximum transmit power $P_{CMAX,c}(i)$ of the terminal device, a quantity $M_{PUSCH,c}(i)$ of RBs allocated by the network device to the terminal device during transmission of a physical uplink shared channel, transmit power $P_{o\_PUSCH}(j)$ that the network device expects to receive and that is of the physical uplink shared channel, a path loss compensation factor $\alpha_c(i)$, a downlink path loss estimate $PL_c$, and an offset $\Delta_{TF,\,c}(i)$ related to an MCS; and correspondingly, the step in which the terminal device determines the uplink transmit power based on the adjustment amount may be:

the terminal device determines transmit power of the physical uplink shared channel based on $P_{CMAX,c}(i)$, $M_{PUSCH,c}(i)$, $P_{o\_PUSCH}(j)$, $\alpha_c(i)$, $PL_c$, $\Delta_{TF,c}(i)$, and the adjustment amount.

It needs to be noted that, in this embodiment of this application, the terminal device determines the transmit power of the physical uplink shared channel based on at least $P_{CMAX,c}(i)$, $M_{PUSCH,c}(i)$, $P_{o\_PUSCH}$, $\alpha_c$, $PL_c$, $\Delta_{TF,c}(i)$, and the adjustment amount. Alternatively, the terminal device may determine the transmit power of the physical uplink shared channel in combination with another power control parameter. In addition, in this embodiment of this application, a specific calculation formula used by the terminal device to determine the transmit power of the physical uplink shared channel based on $P_{CMAX,c}(i)$, $M_{PUSCH,c}(i)$, $P_{o\_PUSCH}$, $\alpha_c(i)$, $PL_c$, $\Delta_{TF,c}(i)$, and the adjustment amount is not specifically limited. For example, the terminal device determines the transmit power of the physical uplink shared channel based on $P_{CMAX,c}(i)$, $M_{PUSCH,c}(i)$, $P_{o\_PUSCH}$, $\alpha_c(i)$, $PL_c$, $\Delta_{TF,c}(i)$, and the adjustment amount by using a formula 3 below.

Formula 3

$$P_{PUSCH,c}(i) = \min \left\{ \begin{array}{l} P_{CMAX,c}(i), \\ 10\log_{10}(M_{PUSCH,c}(i)) + P_{o\_PUSCH,c}(j) + \alpha_c(j) \cdot PL_c + \Delta_{TF,c}(i) + f_c(i) \end{array} \right\}$$

where $P_{PUSCH,c}(i)$ is the transmit power of the physical uplink shared channel, and $f_c(i)$ is the adjustment amount.

It needs to be noted that $P_{o\_PUSCH}(j) = P_{o\_UE\_PUSCH}(j) + P_{o\_NOMINAL\_PUSCH}(j)$, where $P_{o\_UE\_PUSCH}(j)$ is a specific power parameter that is of the terminal device and that is configured by using higher layer signaling, and $P_{o\_NOMINAL\_PUSCH}(j)$ is a specific power parameter that is of a first cell and that is configured by using higher layer signaling. The specific power parameter that is of the terminal device and that is configured by using the higher layer signaling and the specific power parameter that is of the first cell and that is configured by using the higher layer signaling are shown as follows:

```
UplinkPowerControlCommon ::=    SEQUENCE {
    p0-NominalPUSCH                 INTEGER (-126..24),
    alpha                           Alpha-r12,
    p0-NominalPUCCH                 INTEGER (-127..-96),
    deltaFList-PUCCH                DeltaFList-PUCCH,
    deltaPreambleMsg3               INTEGER (-1..6)
}
```

$\Delta_{TF,c}(i) = 10 \log_{10}((2^{BPRE \cdot K_s} - 1) \cdot \alpha_{offset}^{PUSCH})$. There are only two cases: $K_S=0$, and $K_S=1.25$. A specific value of $K_S$ is configured by using a higher layer parameter deltaMCS-Enabled. A specific configuration is as follows:

```
UplinkPowerControl information elements
    UplinkPowerControlDedicated ::=  SEQUENCE {
        p0-UE-PUSCH                     INTEGER (-8..7),
        deltaMCS-Enabled                ENUMERATED {en0, en1},
        accumulationEnabled             BOOLEAN,
        p0-UE-PUCCH                     INTEGER (-8..7),
        pSRS-Offset                     INTEGER (0..15),
        filterCoefficient               FilterCoefficient
                                        DEFAULT fc4
    }
```

For control information transmitted through a physical uplink data channel without data and control multiplexing (UL-SCH) data, $BPRE = O_{CQI}/N_{RE}$ and $$BPRE = \sum_{r=0}^{C-1} K_r / N_{RE},$$

where C is a quantity of code blocks, K is a size of a code block r, and $O_{CQI}$ is a quantity of CQI/precoding matrix indicator (PMI) bits including cyclic redundancy check (CRC) check bits. $N_{RE}$ is a quantity of resource elements (REs), and $N_{RE} = M_{sc}^{PUSCH\text{-}initial} \cdot N_{symb}^{PUSCH\text{-}initial}$. $N_{symb}^{PUSCH\text{-}initial}$ is a quantity of single-carrier frequency-division multiple access (SC-FDMA) symbols that carry physical uplink shared channel data in an initial transmission subframe of a physical uplink shared channel. $M_{sc}^{PUSCH\text{-}initial}$ is a quantity of subcarriers that are scheduled and allocated in the initial transmission subframe of the physical uplink shared channel. For control data transmitted through a physical uplink shared channel without UL_SCH data transmission, $\beta_{offset}^{PUSCH} = \beta_{offset}^{CQI}$; and in other cases, $\beta_{offset}^{PUSCH}$ is 1.

For the fourth implementation, when the terminal device determines the uplink transmit power based on the adjustment amount, the terminal device further needs to obtain a linear value $\hat{P}_{CMAX,c}(i)$ of maximum transmit power of the terminal device, a linear value $\hat{P}_{PUCCH}(i)$ of transmit power of a physical uplink control channel, a quantity $M_{PUSCH,c}(i)$ of RBs allocated by the network device to the terminal device during transmission of a physical uplink control channel, transmit power $P_{o\_PUSCH}(j)$ that the network device expects to receive and that is of the physical uplink shared channel, a path loss compensation factor $\alpha_c(i)$, a downlink path loss estimate $PL_c$, and an offset $\Delta_{TF,c}(i)$ related to an MCS; and correspondingly, the step in which the terminal device determines the uplink transmit power based on the adjustment amount may be:

the terminal device determines transmit power of the physical uplink shared channel based on $\hat{P}_{CMAX,c}(i)$, $\hat{P}_{PUCCH}(i)$, $M_{PUSCH,c}(i)$, $P_{o\_PUSCH}(j)$, $\alpha_c(i)$, $PL_c$, $\Delta_{TF,c}(i)$, and the adjustment amount.

It needs to be noted that, in this embodiment of this application, the terminal device determines the transmit power of the physical uplink shared channel based on at least $\hat{P}_{CMAX,c}(i)$, $\hat{P}_{PUCCH}(i)$, $M_{PUSCH,c}(i)$, $P_{o\_PUSCH}(j)$, $\alpha_c(i)$, $PL_c$, $\Delta_{TF,c}(i)$, and the adjustment amount. Alternatively, the terminal device may determine the transmit power of the physical uplink shared channel in combination with another power control parameter. In addition, in this embodiment of this application, a specific calculation formula used by the terminal device to determine the transmit power of the physical uplink shared channel based $\hat{P}_{CMAX,c}(i)$, $\hat{P}_{PUCCH}(i)$, $M_{PUSCH,c}(i)$, $P_{o\_PUSCH}(j)$, $\alpha_c(i)$, $PL_c$, $\Delta_{TF,c}(i)$, and the adjustment amount is not specifically limited. For example, the terminal device determines the transmit power of the physical uplink shared channel based on $\hat{P}_{CMAX,c}(i)$, $\hat{P}_{PUCCH}$ (i), $M_{PUSCH,c}(i)$, $P_{o\_PUSCH}(j)$, $\alpha_c(i)$, $PL_c$, $\Delta_{TF,c}(i)$, and the adjustment amount by using a formula 4 below.

$$P_{PUSCH,c}(i) = \min\begin{Bmatrix} 10\log_{10}(\hat{P}_{CMAX,c}(i) - \hat{P}_{PUCCH}(i)), \\ 10\log_{10}(M_{PUSCH,c}(i)) + P_{o\_PUSCH,c}(j) + \\ \alpha_c(j) \cdot PL_c + \Delta_{TF,c}(i) + f_c(i) \end{Bmatrix}, \quad \text{Formula 4}$$

where $P_{PUSCH,c}(i)$ is the transmit power of the physical uplink shared channel, and $f_c(i)$ is the adjustment amount.

For the fifth implementation, when the terminal device determines the uplink transmit power based on the adjustment amount, the terminal device further needs to obtain maximum transmit power $P_{CMAX,c}(i)$ of the terminal device, transmit power $P_{SRS\_OFFSET,c}(M)$ that the network device expects to receive and that is of an SRS channel, a quantity $M_{SRS,c}$ of RBs allocated by the network device to the terminal device during transmission of the SRS channel, a quantity $M_{PUSCH,c}(j)$ of RBs allocated by the network device to the terminal device during transmission of a physical uplink control channel, a downlink path loss estimate $PL_c$, and a path loss compensation factor $\alpha_c(i)$; and correspondingly, the step in which the terminal device determines the uplink transmit power based on the adjustment amount may be:

the terminal device determines transmit power of the uplink SRS channel based on $P_{CMAX,c}(i)$, $P_{SRS\_OFFSET,c}(m)$, $M_{SRS,c}$, $M_{PUSCH,c}(j)$, $PL_c$, $\alpha_c(i)$, and the adjustment amount.

The terminal device determines the transmit power of the uplink SRS channel based on $P_{CMAX,c}(i)$, $P_{SRS\_OFFSET,c}(m)$, $M_{SRS,c}$, $M_{PUSCH,c}(j)$, $PL_c$, $\alpha_c(i)$, and the adjustment amount by using a formula 13 below.

$$P_{SRS,c}(i) = \min\{P_{CMAX,c}(i), P_{SRS\_OFFSET,c}(m) + 10\log_{10}(M_{SRS,c}) + P_{o\_PUSCH,c}(j) + \alpha_c(j) \cdot PL_c + f_c(i)\}, \quad \text{Formula 13}$$

where $P_{SRS,c}(i)$ is the transmit power of the uplink SRS channel, and $f_c(i)$ is the adjustment amount.

In this embodiment of this application, cross interference between the terminal device and another terminal device is considered. Therefore, at least two power offset sets are configured. During uplink power control, the terminal device determines, based on the power control indication information, the first power offset set indicated by the power control indication information from the at least two power offset sets; and then determines the first offset from the first power offset set based on the TPC, and determines the uplink transmit power based on the first offset. Because impact of the cross interference is considered in determining the uplink transmit power, the method can be applied to a new radio access technology (New RAT, NR) or 5G. In addition, cross interference to another terminal device is alleviated when the uplink transmit power is determined according to the foregoing method.

An embodiment of this application provides an uplink power control method. In this embodiment of this application, a terminal device receives power control indication information sent by a network device, where the power control indication information indicates a first power offset set, and the first power offset set is any one of at least two power offset sets; and the terminal device receives a transmit power control (TPC) command sent by the network device, determines a first offset indicated by the TPC from the first power offset set, and determines uplink transmit power based on the first offset. In this embodiment of this application, the network device adds the power control indication information to DCI, and sends the DCI to the terminal device; and the terminal device determines the uplink transmit power based on the power control indication information.

Figure 3:
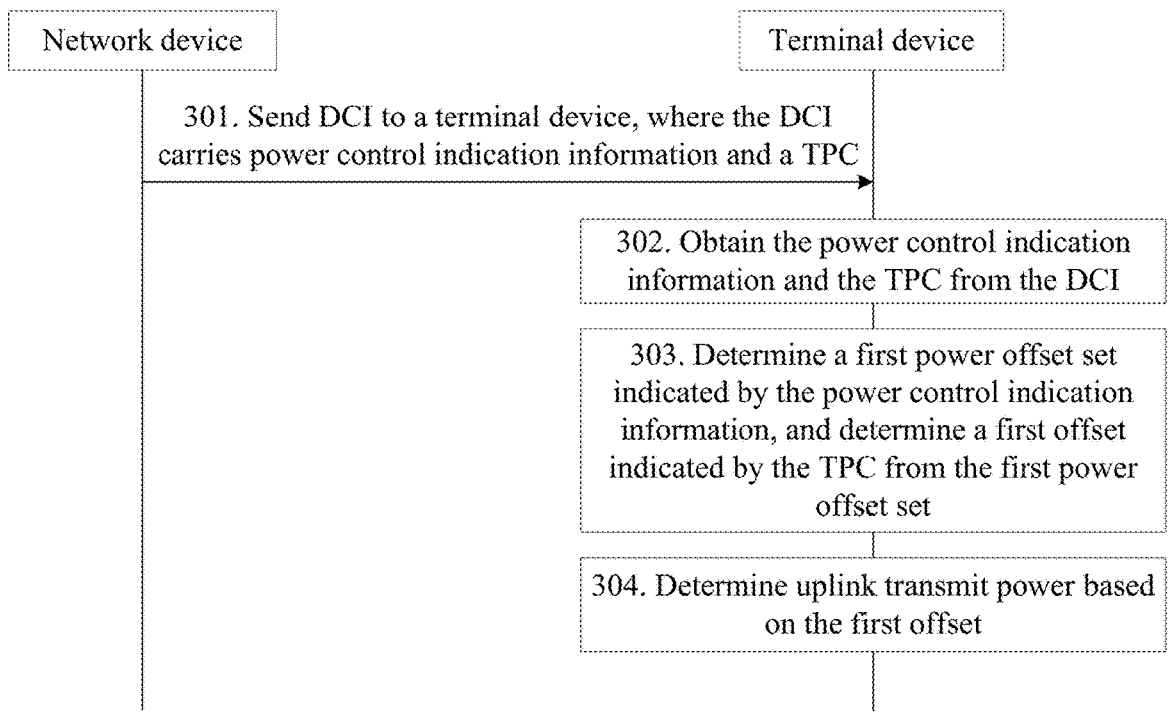
FIG. 3 is a flowchart of an uplink power control method according to an embodiment of this application.

As shown in FIG. 3, the method includes the following steps.

Step 301: A network device determines power control indication information and a TPC, and sends DCI to a terminal device, where the DCI carries the power control indication information and the TPC.

A process in which the network device determines the power control indication information is the same as the process in which the network device determines the power control indication information in step 201, and details are not described herein again. A process in which the network device determines the TPC is the same as the process in which the network device determines the TPC in step 203, and details are not described herein again.

Step 302: The terminal device receives the DCI sent by the network device, and obtains the power control indication information and the TPC from the DCI.

Step 303: The terminal device determines a first power offset set based on the power control indication information, and determines, based on the TPC, a first offset indicated by the TPC from the first power offset set.

A process in which the terminal device determines the first power offset set based on the power control indication information is the same as the process in which the terminal device determines the first power offset set based on the power control indication information in step 202. A process in which the terminal device determines, based on the TPC, the first offset indicated by the TPC from the first power offset set is the same as the process in which the network device determines, based on the TPC, the first offset indicated by the TPC from the first power offset set in step 205, and details are not described herein again.

Step 304: The terminal device determines uplink transmit power based on the first offset.

A process in which the terminal device determines the uplink transmit power based on the first offset is the same as the process in which the terminal device determines the uplink transmit power based on the first offset in step 206, and details are not described herein again.

In this embodiment of this application, cross interference between the terminal device and another terminal device is considered. Therefore, at least two power offset sets are configured. During uplink power control, the terminal device determines, based on the power control indication information, the first power offset set indicated by the power control indication information from the at least two power offset sets; and then determines the first offset from the first power offset set based on the TPC, and determines the uplink transmit power based on the first offset. Because impact of the cross interference is considered in determining the uplink transmit power, the method can be applied to an NR or 5G. In addition, cross interference to another terminal device is alleviated when the uplink transmit power is determined according to the foregoing method.

An embodiment of this application provides an uplink power control method. In this embodiment of this application, a terminal device receives power control indication information sent by a network device, where the power control indication information indicates a first power offset set, and the first power offset set is any one of at least two power offset sets; and the terminal device receives a transmit power control (TPC) command sent by the network device, determines a first offset indicated by the TPC from the first power offset set, and determines uplink transmit power based on the first offset. In this embodiment of this application, the network device adds the power control indication information to a TPC in DCI, and sends the DCI to the terminal device; and the terminal device determines the uplink transmit power based on the power control indication information.

Figure 4:
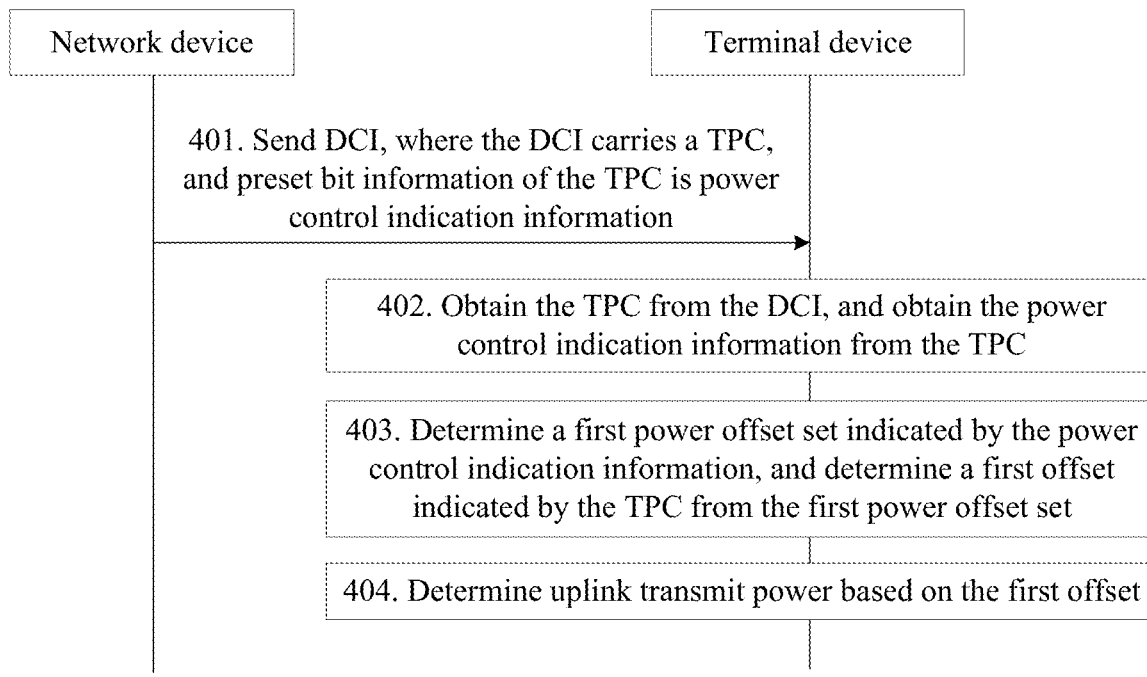
FIG. 4 is a flowchart of an uplink power control method according to an embodiment of this application.

As shown in FIG. 4, the method includes the following steps.

Step 401: A network device determines power control indication information and a TPC, and sends DCI to a terminal device, where the DCI carries the TPC, and preset bit information of the TPC is the power control indication information.

The preset bit information may be 1-bit information, or may include multi-bit information. In addition, the preset bit information may be information of a most significant bit or information of a least significant bit; or may be information of two most significant bits or information of two least significant bits. In this embodiment of this application, the preset bit information is not specifically limited.

Step 402: The terminal device receives the DCI sent by the network device, obtains the TPC from the DCI, and obtains the power control indication information from the TPC.

Step 403: The terminal device determines a first power offset set based on the power control indication information, and determines, based on the TPC, a first offset indicated by the TPC from the first power offset set.

A process in which the terminal device determines the first power offset set based on the power control indication information is the same as the process in which the terminal device determines the first power offset set based on the power control indication information in step 202. A process in which the terminal device determines, based on the TPC, the first offset indicated by the TPC from the first power offset set is the same as the process in which the network device determines, based on the TPC, the first offset indicated by the TPC from the first power offset set in step 205, and details are not described herein again.

Step 404: The terminal device determines uplink transmit power based on the first offset.

A process in which the terminal device determines the uplink transmit power based on the first offset is the same as the process in which the terminal device determines the uplink transmit power based on the first offset in step 206, and details are not described herein again.

In this embodiment of this application, cross interference between the terminal device and another terminal device is considered. Therefore, at least two power offset sets are configured. During uplink power control, the terminal device determines, based on the power control indication information, the first power offset set indicated by the power control indication information from the at least two power offset sets; and then determines the first offset from the first power offset set based on the TPC, and determines the uplink transmit power based on the first offset. Because impact of the cross interference is considered in determining the uplink transmit power, the method can be applied to an NR or 5G. In addition, cross interference to another terminal device is alleviated when the uplink transmit power is determined according to the foregoing method.

An embodiment of this application provides an uplink power control method. In this embodiment of this application, a network device directly determines power control indication information, where the power control indication information indicates a second offset; and the network device sends the power control indication information and a first offset to a terminal device, so that the terminal device determines uplink transmit power based on the first offset and the second offset.

Figure 5:
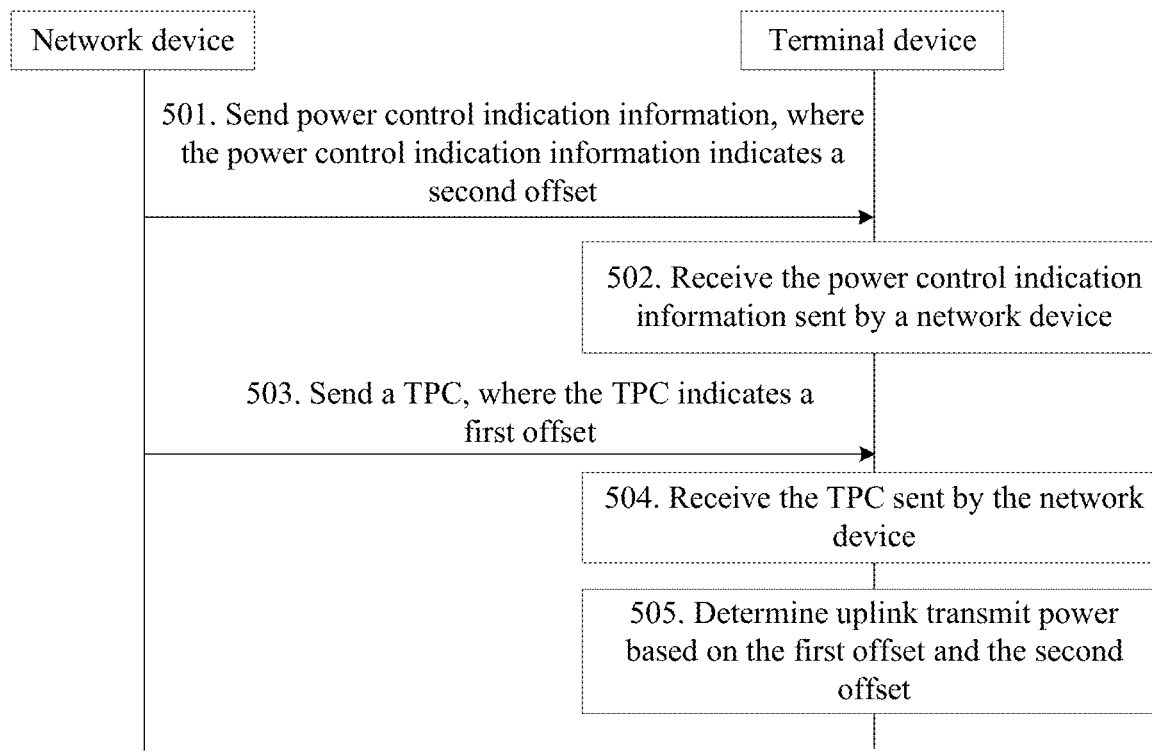
FIG. 5 is a flowchart of an uplink power control method according to an embodiment of this application.

As shown in FIG. 5, the method includes the following steps.

Step 501: A network device determines power control indication information, and sends the power control indication information to a terminal device, where the power control indication information indicates a second offset.

The second offset is determined by the network device based on a cross interference intensity level of cross interference of the terminal device to another terminal device, the cross interference is interference caused by uplink transmission of the terminal device to downlink reception of the another terminal device, a cell on which the terminal device camps is a serving cell, and a cell on which the another terminal device camps is a neighboring cell of the serving cell.

A step in which the network device determines the power control indication information may be:

the network device obtains an interference intensity level of cross interference, and obtains the power control indication information based on the interference intensity level.

When sending the power control indication information to the terminal device, the network device may add the power control indication information to an RRC message and/or DCI. For example, description is made by using an example in which there are two cases for the DCI. The DCI may be DCI used for uplink (UL) or downlink (DL) resource scheduling, or may be DCI dedicated for transmitting power control information.

If the network device adds the power control indication information to an RRC message, a parameter P_CLI (the second offset) is added to IE UplinkPowerControlDedicated in the protocol 36.331.

```
UplinkPowerControlDedicated ::=  SEQUENCE {
    P_CLI              ENUMERATED {0, -3},
    p0-UE-PUSCH        INTEGER (-8..7),
    deltaMCS-Enabled   ENUMERATED {en0, en1},
    accumulationEnabled BOOLEAN,
    p0-UE-PUCCH        INTEGER (-8..7),
    pSRS-Offset        INTEGER (0..15),
    filterCoefficient      FilterCoefficient    DEFAULT fc4
}
```

If the network device adds the power control indication information to DCI used for uplink or downlink resource scheduling, an indication information bit (the second offset) is added to a format of DCI carried on a physical downlink control channel (PDCCH)/an enhanced physical downlink control channel EPDCCH (EPDCCH).

P_CLI indicator—1 bit, where value 0 indicates P_CLI=0 dB and value 1 indicates P_CLI=−3 dB If the network device adds the power control indication information to DCI dedicated for transmitting power control information, a new DCI format X (DCI format 3/3A-Like) may be used.

DCI format X: −P_CLI command number 1, P_CLI command number 2, . . . , P_CLI command number N CRC parity bits of the DCI format X are scrambled by using p_cli-RNTI. When the P_CLI parameter is 0 dB or −3 dB, the P_CLI command number 1 indicates 0 dB or −3 dB.

The parameter p_cli-Index provided by higher layers determines the index to the P_CLI command for a given UE.

Corresponding configurations in the RRC message are as follows:

```
        PhysicalConfigDedicated ::= SEQUENCE {
            p_cli-PDCCH-ConfigPUCCH P_CLI-PDCCH-Config
OPTIONAL,    -- Need ON
            p_cli-PDCCH-ConfigPUSCH P_CLI-PDCCH-Config
OPTIONAL,    -- Need ON
            ...
        }
        P_CLI-PDCCH-Config ::=    CHOICE {
            release         NULL,
            setup           SEQUENCE {
            p_cli-RNTI      BIT STRING (SIZE (16)),
            p_cli-Index     P_CLI-Index
            }
```

It needs to be noted that, when the network device adds the power control indication information to DCI dedicated for transmitting power control information, the DCI may carry power control indication information of a plurality of terminal devices, and a second power offset to be received by the terminal device is determined based on a correspondence between a power control indication information field of the DCI and the terminal device.

Step 502: The terminal device receives the power control indication information sent by the network device.

If the network device adds the power control indication information to an RRC message, the step in which the terminal device receives the power control indication information sent by the network device may be:

the terminal device receives the RRC message sent by the network device, and obtains the power control indication information from the RRC message.

If the network device adds the power control indication information to DCI in an existing format, the step in which the terminal device receives the power control indication information sent by the network device may be:

the terminal device receives the DCI sent by the network device, and obtains the power control indication information from the DCI.

If the network device adds the power control indication information to DCI dedicated for transmitting power control information, the step in which the terminal device receives the power control indication information sent by the network device may be:

if the DCI carries power control indication information of a plurality of terminal devices, the terminal device obtains power control indication information of the terminal device from the DCI based on a correspondence between a device identifier of the terminal device and a power control indication information field of the DCI.

If the network device adds the power control indication information to both an RRC message and DCI, the step in which the terminal device receives the power control indication information sent by the network device may be:

the terminal device receives the RRC message and the DCI that are sent by the network device, and obtains the power control indication information from the RRC message or the DCI based on a priority of the RRC message and a priority of the DCI.

If the priority of the RRC message is higher than the priority of the DCI, the terminal device obtains the power control indication information from the RRC message; or if the priority of the DCI is higher than the priority of the RRC message, the terminal device obtains the power control indication information from the DCI.

Step 503: The network device determines a TPC, and sends the TPC to the terminal device.

Step 504: The terminal device receives the TPC sent by the network device.

Step 505: The terminal device determines uplink transmit power based on a first offset and the second offset.

This step may be implemented by the following steps 5051 and 5052.

5051: The terminal device obtains a transmit power adjustment amount based on the first offset.

5052: The terminal device determines the uplink transmit power based on the adjustment amount and the second offset.

If control information is transmitted between the terminal device and the network device through a physical uplink channel and a format of the DCI is a format 1A/1B/1D/1/2A/2B/2C/2D/2/3, transmit power of the physical uplink control channel may be determined in the following first manner in this step; or if control information is transmitted between the terminal device and the network device through a physical uplink control channel and a format of the DCI is a format 4/5, transmit power of the physical uplink control channel may be determined in the following second manner in this step; or if data information is transmitted between the terminal device and the network device through a physical uplink shared channel, transmit power of the physical uplink shared channel may be determined in the following third manner in this step; or if data information is transmitted between the terminal device and the network device through a physical uplink shared channel, and control information is transmitted between the terminal device and the network device through a physical uplink control channel, transmit power of the physical uplink shared channel may be determined in the following fourth manner in this step. If SRS information is transmitted between the terminal device and the network device through an SRS channel, this step may be implemented in the following fifth manner.

For the first implementation, when the terminal device determines the uplink transmit power based on the adjustment amount and the second offset, the terminal device further needs to obtain maximum transmit power $P_{CMAX,c}(i)$, transmit power $P_{o\_PUCCH}$ that the network device expects to receive and that is of an uplink control channel, a downlink path loss estimate $PL_c$, a first power parameter value $h(n_{CQI}, n_{HARQ}, n^{SR})$ corresponding to a third preset format, a second power parameter value $\Delta_{F\_PUCCH}(F)$ that is configured by the network device for the terminal device and that is of the physical uplink control channel, and a third power parameter value $\Delta_{TxD}(F')$ that is configured by the network device for the terminal device and that is of the physical uplink control channel; and correspondingly, the step in which the terminal device determines the uplink transmit power based on the adjustment amount and the second offset may be:

the terminal device determines transmit power of the physical uplink control channel based on $P_{CMAX,c}(i)$, $P_{o\_PUCCH}$, $PL_c$, $h(n_{CQI}, n_{HARQ}, n_{SR})$, $\Delta_{F\_PUCCH}(F)$, $\Delta_{TxD}(F')$, the adjustment amount, and the second offset.

It needs to be noted that, in this embodiment of this application, the terminal device determines the transmit power of the physical uplink control channel based on at least $P_{CMAX,c}(i)$, $P_{o\_PUCCH}$, $PL_c$, $h(n_{CQI}, n_{HARQ}, n_{SR})$, $\Delta_{F\_PUCCH}(F)$, $\Delta_{TxD}(F')$, the adjustment amount, and the second offset. Alternatively, the terminal device may determine the transmit power of the physical uplink control channel in combination with another power control parameter. In addition, in this embodiment of this application, a specific calculation formula used by the terminal device to determine the transmit power of the physical uplink control channel based on $P_{CMAX,c}(i)$, $P_{o\_PUCCH}$, $PL_c$, $h(n_{CQI}, n_{HARQ}, n_{SR})$, $\Delta_{F\_PUCCH}(F)$, $\Delta_{TxD}(F')$, the adjustment amount, and the second offset is not specifically limited. For example, the terminal device determines the transmit power of the physical uplink control channel based on $P_{CMAX,c}(i)$, $P_{o\_PUCCH}$, $PL_c$, $h(n_{CQI}, n_{HARQ}, n_{SR})$, $\Delta_{F\_PUCCH}(F)$, $\Delta_{TxD}(F')$, the adjustment amount, and the second offset by using a formula 5 below.

Formula 5
$$P_{PUCCH}(i) = \min\begin{Bmatrix} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) + P\_CLI \end{Bmatrix}$$

where $P_{PUCCH}(i)$ is the transmit power of the physical uplink control channel, $g(i)$ is the adjustment amount, and P_CLI is the second offset.

For the second implementation, when the terminal device determines the uplink transmit power based on the adjustment amount and the second offset, the terminal device further needs to obtain maximum transmit power $P_{CMAX,c}(i)$ of the terminal device, transmit power $P_{o\_PUCCH}$ that the network device expects to receive and that is of a physical uplink control channel, a downlink path loss estimate $PL_c$, a quantity $M_{PUSCH,c}(i)$ of RBs allocated by the network device to the terminal device during transmission of the physical uplink control channel, an offset $\Delta_{TF,\ c}(i)$ related to an MCS, and a second power parameter value $\Delta_{F\_PUCCH}(F)$ that is configured by the network device for the terminal device and that is of the physical uplink control channel; and correspondingly, the step in which the terminal device determines the uplink transmit power based on the adjustment amount and the second offset may be:

the terminal device determines transmit power of the physical uplink control channel based on $P_{CMAX,c}(i)$, $P_{o\_PUCCH}$, $PL_c$, $M_{PUSCH,c}(i)$, $\Delta_{TF,\ c}(i)$, $\Delta_{F\_PUCCH}(F)$, the adjustment amount, and the second offset.

It needs to be noted that, in this embodiment of this application, the terminal device determines the transmit power of the physical uplink control channel based on at least $P_{CMAX,c}(i)$, $P_{o\_PUCCH}$, $PL_c$, $M_{PUSCH,c}(i)$, $\Delta_{TF,\ c}(i)$, $\Delta_{F\_PUCCH}(F)$, the adjustment amount, and the second offset. Alternatively, the terminal device may determine the transmit power of the physical uplink control channel in combination with another power control parameter. In addition, in this embodiment of this application, a specific calculation formula used by the terminal device to determine the transmit power of the physical uplink control channel based on $P_{CMAX,c}(i)$, $P_{o\_PUCCH}$, $PL_c$, $M_{PUSCH,c}(i)$, $\Delta_{TF,\ c}(i)$, $\Delta_{F\_PUCCH}(F)$, the adjustment amount, and the second offset is not specifically limited. For example, the terminal device determines the transmit power of the physical uplink control channel based on $P_{CMAX,c}(i)$, $P_{o\_PUCCH}$, $PL_c$, $M_{PUSCH,c}(i)$, $\Delta_{TF,\ c}(i)$, $\Delta_{F\_PUCCH}(F)$, the adjustment amount, and the second offset by using a formula 6 below.

Formula 6
$$P_{PUCCH}(i) = \min\begin{Bmatrix} P_{CMAX,c}(i), \\ P_{0\_PUCCH} + PL_c + 10\log_{10}(M_{PUCCH,c}(i)) + \\ \Delta_{TF,c}(i) + \Delta_{F\_PUCCH}(F) + g(i) + P\_CLI \end{Bmatrix}$$

where $P_{PUCCH}(i)$ is the transmit power of the physical uplink control channel, $g(i)$ is the adjustment amount, and P_CLI is the second offset.

For the third implementation, when the terminal device determines the uplink transmit power based on the adjustment amount and the second offset, the terminal device further needs to obtain maximum transmit power $P_{CMAX,c}(i)$ of the terminal device, a quantity $M_{PUSCH,c}(i)$ of RBs allocated by the network device to the terminal device during transmission of a physical uplink control channel, transmit power $P_{o\_PUSCH}(j)$ that the network device expects to receive and that is of the physical uplink shared channel, a path loss compensation factor $\alpha_c(i)$, a downlink path loss estimate $PL_c$, and an offset $\Delta_{TF,\ c}(i)$ related to an MCS; and correspondingly, the step in which the terminal device determines the uplink transmit power based on the adjustment amount and the second offset may be:

the terminal device determines transmit power of the physical uplink shared channel based on $P_{CMAX,c}(i)$, $M_{PUSCH,c}(i)$, $P_{o\_PUSCH}(j)$, $\alpha_c(i)$, $PL_c$, $\Delta_{TF,\ c}(i)$, the adjustment amount, and the second offset.

It needs to be noted that, in this embodiment of this application, the terminal device determines the transmit power of the physical uplink shared channel based on at least $P_{CMAX,c}(i)$, $M_{PUSCH,c}(i)$, $P_{o\_PUSCH}(j)$, $\alpha_c(i)$, $PL_c$, $\Delta_{TF,\ c}(i)$, the adjustment amount, and the second offset. Alternatively, the terminal device may determine the transmit power of the physical uplink shared channel in combination with another power control parameter. In addition, in this embodiment of this application, a specific calculation formula used by the terminal device to determine the transmit power of the physical uplink shared channel based on $P_{CMAX,c}(i)$, $M_{PUSCH,c}(i)$, $P_{o\_PUSCH}(j)$, $\alpha_c(i)$, $PL_c$, $\Delta_{TF,\ c}(i)$, the adjustment amount, and the second offset is not specifically limited. For example, the terminal device determines the transmit power of the physical uplink shared channel based on $P_{CMAX,c}(i)$, $M_{PUSCH,c}(i)$, $P_{o\_PUSCH}(j)$, $\alpha_c(i)$, $PL_c$, $\Delta_{TF,\ c}(i)$, the adjustment amount, and the second offset by using a formula 7 below.

Formula 7
$$P_{PUSCH,c}(i) = \min\begin{Bmatrix} P_{CMAX,c}(i), \\ 10\log_{10}(M_{PUSCH,c}(i)) + P_{0\_PUSCH,c}(j) + \\ \alpha_c(j) \cdot PL_c + \Delta_{TF,c}(i) + f_c(i) + P\_CLI \end{Bmatrix}$$

where $P_{PUSCH,c}(i)$ is the transmit power of the physical uplink shared channel, and P_CLI is the second offset.

For the fourth implementation, when the terminal device determines the uplink transmit power based on the adjustment amount and the second offset, the terminal device further needs to obtain a linear value $\hat{P}_{CMAX,c}$ of maximum transmit power of the terminal device, a linear value $\hat{P}_{PUCCH}(i)$ of transmit power of a physical uplink control channel, a quantity $M_{PUSCH,c}(i)$ of RBs allocated by the network device to the terminal device during transmission of a physical uplink control channel, transmit power $P_{o\_PUSCH}(j)$ that the network device expects to receive and that is of the physical uplink shared channel, a path loss compensation factor $\alpha_c(i)$, a downlink path loss estimate $PL_c$, and an offset $\Delta_{TF,\ c}(i)$ related to an MCS; and correspondingly, the step in which the terminal device determines the uplink transmit power based on the adjustment amount and the second offset may be:

the terminal device determines transmit power of the physical uplink shared channel based on $\hat{P}_{CMAX,c}(i)$, $\hat{P}_{PUCCH}(i)$, $M_{PUSCH,c}(i)$, $P_{o\_PUSCH}(j)$, $\Delta_c(i)$, $PL_c$, $\Delta_{TF,\ c}(i)$, the adjustment amount, and the second offset.

It needs to be noted that, in this embodiment of this application, the terminal device determines the transmit power of the physical uplink shared channel based on at least $\hat{P}_{CMAX,c}(i)$, $\hat{P}_{PUCCH}(i)$, $M_{PUSCH,c}(i)$, $P_{o\_PUSCH}(j)$, $\Delta_c(i)$, $PL_c$, $\Delta_{TF,\ c}(i)$, the adjustment amount, and the second offset. Alternatively, the terminal device may determine the transmit power of the physical uplink shared channel in combination with another power control parameter. In addition, in this embodiment of this application, a specific calculation formula used by the terminal device to determine the transmit power of the physical uplink shared channel based on $\hat{P}_{CMAX,c}(i)$, $\hat{P}_{PUCCH}(i)$, $M_{PUSCH,c}(i)$, $P_{o\_PUSCH}(j)$, $\alpha_c(i)$, $PL_c$, $\Delta_{TF,\ c}(i)$, the adjustment amount, and the second offset is not specifically limited. For example, the terminal device determines the transmit power of the physical uplink shared channel based on $\hat{P}_{CMAX,c}(i)$, $\hat{P}_{PUCCH}(i)$, $M_{PUSCH,c}(i)$, $P_{o\_PUSCH}(j)$, $\alpha_c(i)$, $PL_c$, $\Delta_{TF,\ c}(i)$, the adjustment amount, and the second offset by using a formula 8 below.

$$P_{PUSCH,c}(i) = \min\begin{Bmatrix} 10\log_{10}(\hat{P}_{CMAX,c}(i) - \hat{P}_{PUCCH}(i)), \\ 10\log_{10}(M_{PUSCH,c}(i)) + P_{o\_PUSCH,c}(j) + \\ \alpha_c(j) \cdot PL_c + \Delta_{TF,c}(i) + f_c(i) + P\_CLI \end{Bmatrix},$$

Formula 8 where $P_{PUSCH,c}(i)$ is the transmit power of the physical uplink shared channel, $f_c(i)$ is the adjustment amount, and P_CLI is the second offset.

For the fifth implementation, when the terminal device determines the uplink transmit power based on the adjustment amount and the second offset, the terminal device further needs to obtain maximum transmit power $P_{CMAX,\ c}(i)$ of the terminal device, transmit power $P_{SRS\_OFFSET,c}(m)$ that the network device expects to receive and that is of an SRS channel, a quantity $M_{SRS,c}$ of RBs allocated by the network device to the terminal device during transmission of the SRS channel, a quantity $M_{PUSCH,c}(j)$ of RBs allocated by the network device to the terminal device during transmission of a physical uplink control channel, a downlink path loss estimate $PL_c$, and a path loss compensation factor $\alpha_c(i)$; and correspondingly, the step in which the terminal device determines the uplink transmit power based on the adjustment amount and the second offset may be:

the terminal device determines transmit power of the uplink SRS channel based on $P_{CMAX,c}(i)$, $P_{SRS\_OFFSET,c}(M)$, $M_{SRS,c}$, $M_{PUSCH,c}(j)$, $PL_c$, $\alpha_c(i)$, the adjustment amount, and the second offset.

The terminal device determines the transmit power of the uplink SRS channel based on $P_{CMAX,c}(i)$, $P_{SRS\_OFFSET,c}(m)$, $M_{SRS,c}$, $M_{PUSCH,c}(j)$, $PL_c$, $\alpha_c(i)$, the adjustment amount, and the second offset by using a formula 14 below.

$P_{SRS,c}(i)=\min\{P_{CMAX,c}(i), P_{SRS\_OFFSET,c}(m)+10\log_{10}(M_{SRS,c})+P_{o\_PUSCH,c}(j)+\alpha_c(j)\cdot PL_c+f_c(i)+P\_CLI\}$, Formula 14 where $P_{SRS,c}(i)$ is the transmit power of the uplink SRS channel, $f_c(i)$ is the adjustment amount, and P_CLI is the second offset.

In this embodiment of this application, cross interference between the terminal device and another terminal device is considered. The terminal device receives the power control indication information sent by the network device, where the power control indication information indicates the second offset, the second offset is generated by the network device based on the cross interference of the terminal device, and the cross interference is caused by uplink transmission of the terminal device to downlink reception of another terminal device. The network device sends the power control indication information to the terminal device, and the terminal device determines the uplink transmit power based on the second offset indicated by the power control indication information. Because impact of the cross interference is considered in determining the uplink transmit power, the method can be applied to an NR or 5G. In addition, cross interference to another terminal device is alleviated when the uplink transmit power is determined according to the foregoing method.

An embodiment of this application provides an uplink power control method. In this embodiment of this application, a network device determines uplink transmit power that the network device currently expects to receive, and sends the uplink transmit power that the network device currently expects to receive to a terminal device; and the terminal device determines uplink transmit power based on the uplink transmit power that the network device currently expects to receive.

Figure 6:
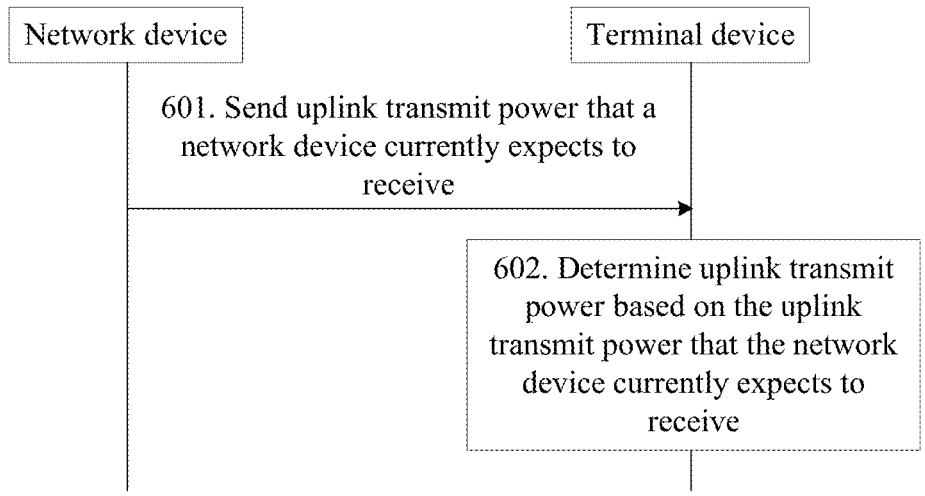
FIG. 6 is a flowchart of an uplink power control method according to an embodiment of this application.

As shown in FIG. 6, the method includes the following steps.

Step 601: A network device determines uplink transmit power that the network device currently expects to receive, and sends the uplink transmit power that the network device currently expects to receive to a terminal device.

The network device obtains an interference intensity level of cross interference, obtains a power offset based on the interference intensity level, and determines, based on the power offset and uplink transmit power that the network device previously expected to receive, the uplink transmit power that the network device currently expects to receive.

A step in which the network device determines, based on the power offset and the uplink transmit power that the network device previously expected to receive, the uplink transmit power that the network device currently expects to receive may be:

the network device uses a sum of the power offset and the uplink transmit power that the network device previously expected to receive as the uplink transmit power that the network device currently expects to receive.

The network device sends configuration information to the terminal device, where the configuration information carries the uplink transmit power that the network device currently expects to receive.

If control information is transmitted between the terminal device and the network device through a physical uplink control channel, the uplink transmit power expected to be received may be reflected in $P_{o\_UE\_PUCCH}$. The configuration information sent by the network device to the terminal device may be:

```
UplinkPowerControlDedicated ::= SEQUENCE {
    p0-UE-PUSCH            INTEGER (-11..7),
    deltaMCS-Enabled       ENUMERATED {en0, en1},
    accumulationEnabled    BOOLEAN,
    p0-UE-PUCCH            INTEGER (-11..7),
    pSRS-Offset            INTEGER (0..15),
    filterCoefficient      FilterCoefficient   DEFAULT fc4
}
```

If data information is transmitted between the terminal device and the network device through a physical uplink shared channel, the uplink transmit power expected to be received may be reflected in $P_{o\_UE\_USCH}$. The configuration information sent by the network device to the terminal device may be:

```
UplinkPowerControlDedicated ::=  SEQUENCE {
    p0-UE-PUSCH           INTEGER (-11..7),
    deltaMCS-Enabled      ENUMERATED {en0, en1},
    accumulationEnabled   BOOLEAN,
    p0-UE-PUCCH           INTEGER (-8..7),
    pSRS-Offset           INTEGER (0..15),
    filterCoefficient     FilterCoefficient  DEFAULT fc4
}
```

Step 602: The terminal device receives the uplink transmit power that the network device currently expects to receive and that is sent by the network device, and determines uplink transmit power based on the uplink transmit power that the network device currently expects to receive.

If control information is transmitted between the terminal device and the network device through a physical uplink channel and a format of DCI is a format 1A/1B/1D/1/2A/2B/2C/2D/2/3, transmit power of the physical uplink control channel may be determined in the following first manner in this step; or if control information is transmitted between the terminal device and the network device through a physical uplink control channel and a format of DCI is a format 4/5, transmit power of the physical uplink control channel may be determined in the following second manner in this step; or if data information is transmitted between the terminal device and the network device through a physical uplink shared channel, transmit power of the physical uplink shared channel may be determined in the following third manner in this step; or if data information is transmitted between the terminal device and the network device through a physical uplink shared channel, and control information is transmitted between the terminal device and the network device through a physical uplink control channel, transmit power of the physical uplink shared channel may be determined in the following fourth manner in this step.

For the first implementation, when the terminal device determines the uplink transmit power based on the uplink transmit power that the network device currently expects to receive, the terminal device further needs to obtain maximum transmit power $P_{CMAX,c}(i)$, a downlink path loss estimate $PL_c$, a first power parameter value $h(n_{CQI}, n_{HARQ}, n_{SR})$ corresponding to a third preset format, a second power parameter value $\Delta_{F\_PUCCH}(F)$ that is configured by the network device for the terminal device and that is of a physical uplink control channel, a third power parameter value $\Delta_{TxD}(F')$ that is configured by the network device for the terminal device and that is of the physical uplink control channel, and an adjustment amount $g(i)$; and correspondingly, the step in which the terminal device determines the uplink transmit power based on the uplink transmit power that the network device currently expects to receive may be:

the terminal device determines transmit power of the physical uplink control channel based on $P_{CMAX,c}(i)$, $PL_c$, $h(n_{CQI}, n_{HARQ}, n_{SR})$, $\Delta_{F\_PUCCH}(F)$, $\Delta_{TxD}(F')$, $g(i)$, and the uplink transmit power that the network device currently expects to receive.

It needs to be noted that, in this embodiment of this application, the terminal device determines the transmit power of the physical uplink control channel based on at least $P_{CMAX,c}(i)$, $PL_c$, $h(n_{CQI}, n_{HARQ}, n_{SR})$, $\Delta_{F\_PUCCH}(F)$, $\Delta_{TxD}(F')$, $g(i)$, and the uplink transmit power that the network device currently expects to receive. Alternatively, the terminal device may determine the transmit power of the physical uplink control channel in combination with another power control parameter. In addition, in this embodiment of this application, a specific calculation formula used by the terminal device to determine the transmit power of the physical uplink control channel based on $P_{CMAX,c}(i)$, $PL_c$, $h(n_{CQI}, n_{HARQ}, n_{SR})$, $\Delta_{F\_PUCCH}(F)$, $\Delta_{TxD}(F')$, $g(i)$, and the uplink transmit power that the network device currently expects to receive is not specifically limited. For example, the terminal device determines, by using a formula 9 below, the transmit power of the physical uplink control channel based on $P_{CMAX,c}(i)$, $PL_c$, $h(n_{CQI}, n_{HARQ}, n_{SR})$, $\Delta_{F\_PUCCH}(F)$, $\Delta_{TxD}(F')$, $g(i)$, and the uplink transmit power that the network device currently expects to receive.

Formula 9

$$P_{PUCCH}(i) = \min\begin{Bmatrix} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{Bmatrix},$$

where $P_{PUCCH}(i)$ is the transmit power of the physical uplink control channel, and $P_{o\_PUCCH}$ is the uplink transmit power that the network device currently expects to receive.

For the second implementation, when the terminal device determines the uplink transmit power based on the uplink transmit power that the network device currently expects to receive, the terminal device further needs to obtain maximum transmit power $P_{CMAX,c}(i)$ of the terminal device, a downlink path loss estimate $PL_c$, a quantity $M_{PUSCH,c}(i)$ of RBs allocated by the network device to the terminal device during transmission of a physical uplink control channel, an offset $\Delta_{TF, c}(i)$ related to an MCS, a second power parameter value $\Delta_{F\_PUCCH}(F)$ that is configured by the network device for the terminal device and that is of the physical uplink control channel, and an adjustment amount $g(i)$; and correspondingly, the step in which the terminal device determines the uplink transmit power based on the uplink transmit power that the network device currently expects to receive may be:

the terminal device determines transmit power of the physical uplink control channel based on $P_{CMAX,c}(i)$, $PL_c$, $M_{PUSCH,c}(i)$, $\Delta_{TF, c}(i)$, $\Delta_{F\_PUCCH}(F)$, $g(i)$, and transmit power that the network device expects to receive and that is of the physical uplink control channel.

It needs to be noted that, in this embodiment of this application, the terminal device determines the transmit power of the physical uplink control channel based on at least $P_{CMAX,c}(i)$, $PL_c$, $M_{PUSCH,c}(i)$, $\Delta_{TF, c}(i)$, $\Delta_{F\_PUCCH}(F)$, $g(i)$, and the transmit power that the network device expects to receive and that is of the physical uplink control channel. Alternatively, the terminal device may determine the transmit power of the physical uplink control channel in combination with another power control parameter. In addition, in this embodiment of this application, a specific calculation formula used by the terminal device to determine the transmit power of the physical uplink control channel based on $P_{CMAX,c}(i)$, $PL_c$, $M_{PUSCH,c}(i)$, $\Delta_{TF, c}(i)$, $\Delta_{F\_PUCCH}(F)$, $g(i)$, and the transmit power that the network device expects to receive and that is of the physical uplink control channel is not specifically limited. For example, the terminal device determines, by using a formula 10 below, the transmit power of the physical uplink control channel based on $P_{CMAX,c}(i)$, $PL_c$, $M_{PUSCH,c}(i)$, $\Delta_{TF, c}(i)$, $\Delta_{F\_PUCCH}(F)$, $g(i)$, and the transmit power that the network device expects to receive and that is of the physical uplink control channel.

$$P_{PUCCH}(i) = \min \begin{Bmatrix} P_{CMAX,c}(i), \\ P_{0\_PUCCH} + PL_c + 10\log_{10}(M_{PUCCH,c}(i)) + \\ \Delta_{TF,c}(i) + \Delta_{F\_PUCCH}(F) + g(i) \end{Bmatrix},$$

Formula 10 where $P_{PUCCH}(i)$ is the transmit power of the physical uplink control channel, and $P_{o\_PUCCH}$ is the transmit power that the network device expects to receive and that is of the physical uplink control channel.

For the third implementation, when the terminal device determines the uplink transmit power based on the uplink transmit power that the network device currently expects to receive, the terminal device further needs to obtain maximum transmit power $P_{CMAX,c}(i)$ of the terminal device, a quantity $M_{PUSCH,c}(i)$ of RBs allocated by the network device to the terminal device during transmission of a physical uplink control channel, a path loss compensation factor $\alpha_c(i)$, a downlink path loss estimate $PL_c$, an offset $\Delta_{TF,c}(i)$ related to an MCS, and an adjustment amount f(i); and correspondingly, the step in which the terminal device determines the uplink transmit power based on the uplink transmit power that the network device currently expects to receive may be:

the terminal device determines transmit power of the physical uplink shared channel based on $P_{CMAX,c}(i)$, $M_{PUSCH,c}(i)$, $\alpha_c(i)$, $PL_c$, $\Delta_{TF,c}(i)$, f(i), and transmit power that the network device expects to receive and that is of the physical uplink shared channel.

It needs to be noted that, in this embodiment of this application, the terminal device determines the transmit power of the physical uplink shared channel based on at least $P_{CMAX,c}(i)$, $M_{PUSCH,c}(i)$, $\alpha_c(i)$, $PL_c$, $\Delta_{TF,c}(i)$, f(i), and the transmit power that the network device expects to receive and that is of the physical uplink shared channel. Alternatively, the terminal device may determine the transmit power of the physical uplink shared channel in combination with another power control parameter. In addition, in this embodiment of this application, a specific calculation formula used by the terminal device to determine the transmit power of the physical uplink shared channel based on $P_{CMAX,c}(i)$, $M_{PUSCH,c}(i)$, $\alpha_c(i)$, $PL_c$, $\Delta_{TF,c}(i)$, f(i), and the transmit power that the network device expects to receive and that is of the physical uplink shared channel is not specifically limited. For example, the terminal device determines, by using a formula 11 below, the transmit power of the physical uplink shared channel based on $P_{CMAX,c}(i)$, $M_{PUSCH,c}(i)$, $\alpha_c(i)$, $PL_c$, $\Delta_{TF,c}(i)$, f(i), and the transmit power that the network device expects to receive and that is of the physical uplink shared channel.

$$P_{PUSCH,c}(i) = \min \begin{Bmatrix} P_{CMAX,c}(i), \\ 10\log_{10}(M_{PUSCH,c}(i)) + P_{0\_PUSCH,c}(j) + \\ \alpha_c(j) \cdot PL_c + \Delta_{TF,c}(i) + f_c(i) \end{Bmatrix},$$

Formula 11 where $P_{PUSCH,c}(i)$ is the transmit power of the physical uplink shared channel, and $P_{o\_PUSCH}(j)$ is the transmit power that the network device expects to receive and that is of the physical uplink shared channel.

For the fourth implementation, when the terminal device determines the uplink transmit power based on the uplink transmit power that the network device currently expects to receive, the terminal device further needs to obtain a linear value $\hat{P}_{CMAX,c}(i)$ of maximum transmit power of the terminal device, a linear value $\hat{P}_{PUCCH}(i)$ of transmit power of a physical uplink control channel, a quantity $M_{PUSCH,c}(i)$ of RBs allocated by the network device to the terminal device during transmission of a physical uplink control channel, a path loss compensation factor $\alpha_c(i)$, a downlink path loss estimate $PL_c$, an offset $\Delta_{TF,c}(i)$ related to an MCS, and an adjustment amount f(i); and correspondingly, the step in which the terminal device determines the uplink transmit power based on the uplink transmit power that the network device currently expects to receive may be:

the terminal device determines transmit power of the physical uplink shared channel based on $\hat{P}_{CMAX,c}(i)$, $\hat{P}_{PUCCH}(i)$, $M_{PUSCH,c}(i)$, $\alpha_c(i)$, $PL_c$, $\Delta_{TF,c}(i)$, f(i), and the uplink transmit power that the network device currently expects to receive.

It needs to be noted that, in this embodiment of this application, the terminal device determines the transmit power of the physical uplink shared channel based on at least $\hat{P}_{CMAX,c}(i)$, $\hat{P}_{PUCCH}(i)$, $M_{PUSCH,c}(i)$, $\alpha_c(i)$, $PL_c$, $\Delta_{TF,c}(i)$, f(i), and the uplink transmit power that the network device currently expects to receive. Alternatively, the terminal device may determine the transmit power of the physical uplink shared channel in combination with another power control parameter. In addition, in this embodiment of this application, a specific calculation formula used by the terminal device to determine the transmit power of the physical uplink shared channel based on $\hat{P}_{CMAX,c}(i)$, $\hat{P}_{PUCCH}(i)$, $M_{PUSCH,c}(i)$, $\alpha_c(i)$, $PL_c$, $\Delta_{TF,c}(i)$, f(i), and the uplink transmit power that the network device currently expects to receive is not specifically limited. For example, the terminal device determines, by using a formula 12 below, the transmit power of the physical uplink shared channel based on $\hat{P}_{CMAX,c}(i)$, $\hat{P}_{PUCCH}(i)$, $M_{PUSCH,c}(i)$, $\alpha_c(i)$, $PL_c$, $\Delta_{TF,c}(i)$, f(i), and the uplink transmit power that the network device currently expects to receive.

$$P_{PUSCH,c}(i) = \min \begin{Bmatrix} 10\log_{10}(\hat{P}_{CMAX,c}(i) - \hat{P}_{PUCCH}(i)), \\ 10\log_{10}(M_{PUSCH,c}(i)) + P_{0\_PUSCH,c}(j) + \\ \alpha_c(j) \cdot PL_c + \Delta_{TF,c}(i) + f_c(i) \end{Bmatrix},$$

Formula 12 where $P_{PUSCH,c}(i)$ is the transmit power of the physical uplink shared channel, and $P_{o\_PUSCH}(j)$ is transmit power that the network device expects to receive and that is of the physical uplink shared channel.

In this embodiment of this application, the network device determines, based on the interference intensity level of the cross interference, the uplink transmit power that the network device currently expects to receive, and sends the uplink transmit power that the network device currently expects to receive to the terminal device; and the terminal device determines the uplink transmit power based on the uplink transmit power that the network device currently expects to receive. Because impact of the cross interference is considered in determining the uplink transmit power, the method can be applied to an NR or 5G. In addition, cross interference to another terminal device is alleviated when the uplink transmit power is determined according to the foregoing method.

An embodiment of this application provides an uplink power control method. In this embodiment of this application, a network device determines a current TPC of a terminal device based on first power control indication information, and sends the TPC to the terminal device; and the terminal device determines uplink transmit power based on the TPC.

Figure 7:
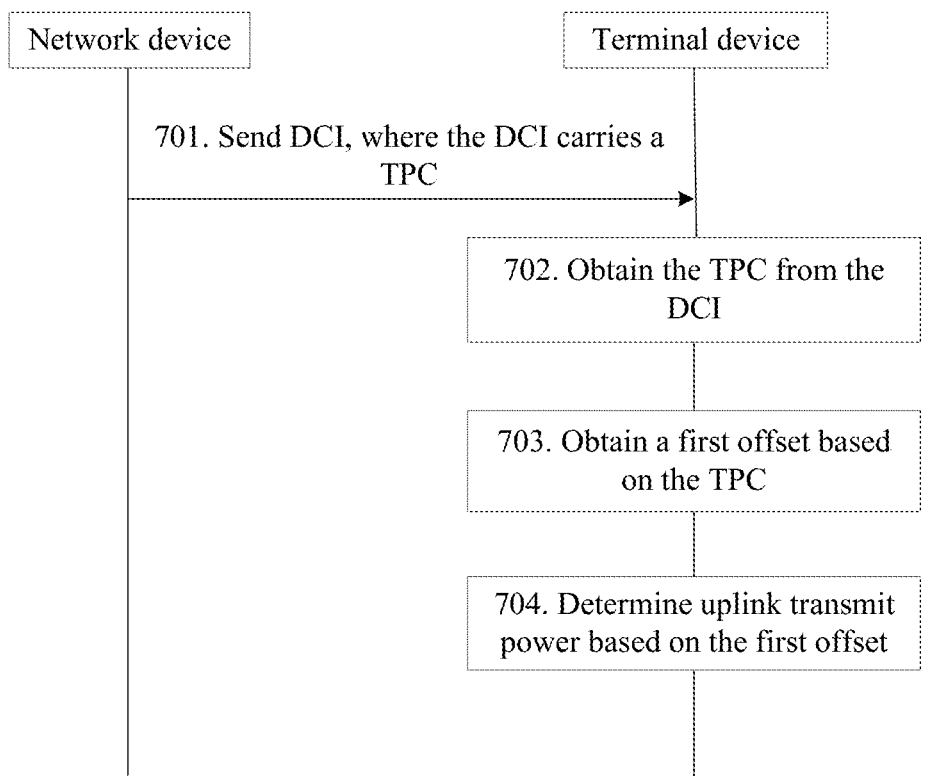
FIG. 7 is a flowchart of an uplink power control method according to an embodiment of this application.

As shown in FIG. 7, the method includes the following steps.

Step 701: A network device determines a TPC of a terminal device, and sends DCI to the terminal device, where the DCI carries the TPC.

The network device obtains an interference intensity level of cross interference, and determines the TPC of the terminal device based on the interference intensity level.

The network device obtains, from a correspondence between an interference intensity level and a TPC based on the interference intensity level, a TPC corresponding to the interference intensity level.

For example, if an interference intensity level of cross interference between the terminal device and another terminal device is 1, the TPC may be 0; or if an interference intensity level of cross interference between the terminal device and another terminal device is 2, the TPC may be −3 or the like.

In this embodiment of this application, because the cross interference is considered, a quantity of TPC indication bits increases. For example, there are only two TPCs (0 and 1) in the prior art, but there are probably four TPCs (0, 1, 2, and 3) in this embodiment of this application. For another example, there are four TPCs (0, 1, 2, and 3) in the prior art, but there are probably eight TPCs (0, 1, 2, 3, 4, 5, 6, and 7) in this embodiment of this application.

Step 702: The terminal device receives the DCI sent by the network device, and obtains the TPC from the DCI.

Step 703: The terminal device obtains a first offset based on the TPC.

The terminal device stores a first power offset set, where the first power offset set includes a correspondence between a TPC and an offset; and correspondingly, this step may be:

the terminal device obtains, based on the TPC, a first offset corresponding to the TPC from the first power offset set.

For example, when a physical uplink channel is a physical uplink control channel and a format of the DCI is a format 1A/1B/1D/1/2A/2B/2C/2D/2/3, the first power offset set is shown in Table 5 below.

TABLE 5

| TPC | First power offset set |
|---|---|
| 0 | −1 |
| 1 | 0 |
| 2 | 1 |
| 3 | 3 |
| 4 | −4 |
| 5 | −3 |
| 6 | −2 |

For another example, if the physical uplink channel is a physical uplink control channel and the format of the DCI is a format 3A, the first power offset set is shown in Table 6 below.

TABLE 6

| TPC | First power offset set |
|---|---|
| 0 | −1 |
| 1 | 1 |
| 2 | −4 |
| 3 | −2 |

For another example, if the physical uplink channel is a physical uplink shared channel and the format of the DCI is a format 3A, the first power offset set is shown in Table 7 below.

TABLE 7

| TPC | First power offset set |
|---|---|
| 0 | −1 |
| 1 | 1 |
| 2 | −4 |
| 3 | −2 |

For another example, if the physical uplink channel is a physical uplink shared channel and the format of the DCI is a format 0/3/4, the first power offset set is shown in Table 8 below.

TABLE 8

| TPC | First power offset set in an accumulated mode | First power offset set in an absolute mode |
|---|---|---|
| 0 | −1 | −4 |
| 1 | 0 | −1 |
| 2 | 1 | 1 |
| 3 | 3 | 4 |
| 4 | −4 | −8 |
| 5 | −3 | −5 |
| 6 | −2 | −2 |

Step 704: The terminal device determines uplink transmit power based on the first offset.

A process in which the terminal device determines the uplink transmit power based on the first offset is the same as the process in which the terminal device determines the uplink transmit power based on the first offset in step 206, and details are not described herein again.

In this embodiment of this application, the network device determines the current TPC of the terminal device based on the interference intensity level of the cross interference, and sends the TPC to the terminal device; and the terminal device determines the uplink transmit power based on the TPC. Because impact of the cross interference is considered in determining the uplink transmit power, the method can be applied to an NR or 5G. In addition, cross interference to another terminal device is alleviated when the uplink transmit power is determined according to the foregoing method.

An embodiment of this application provides an uplink power control method. In this embodiment of this application, power control indication information includes first power control indication information and second power control indication information, the first power control indication information indicates a second power offset set, the second power offset set includes at least one second offset, and the second power control indication information indicates a second offset in the second power offset set. A network device adds the first power control indication information to an RRC message, adds the second power control indication information to DCI, and sends the RRC message, the DCI, and a first offset to a terminal device. The terminal device determines the second offset based on the RRC message and the DCI, and determines uplink transmit power based on the first offset and the second offset.

Figure 8:
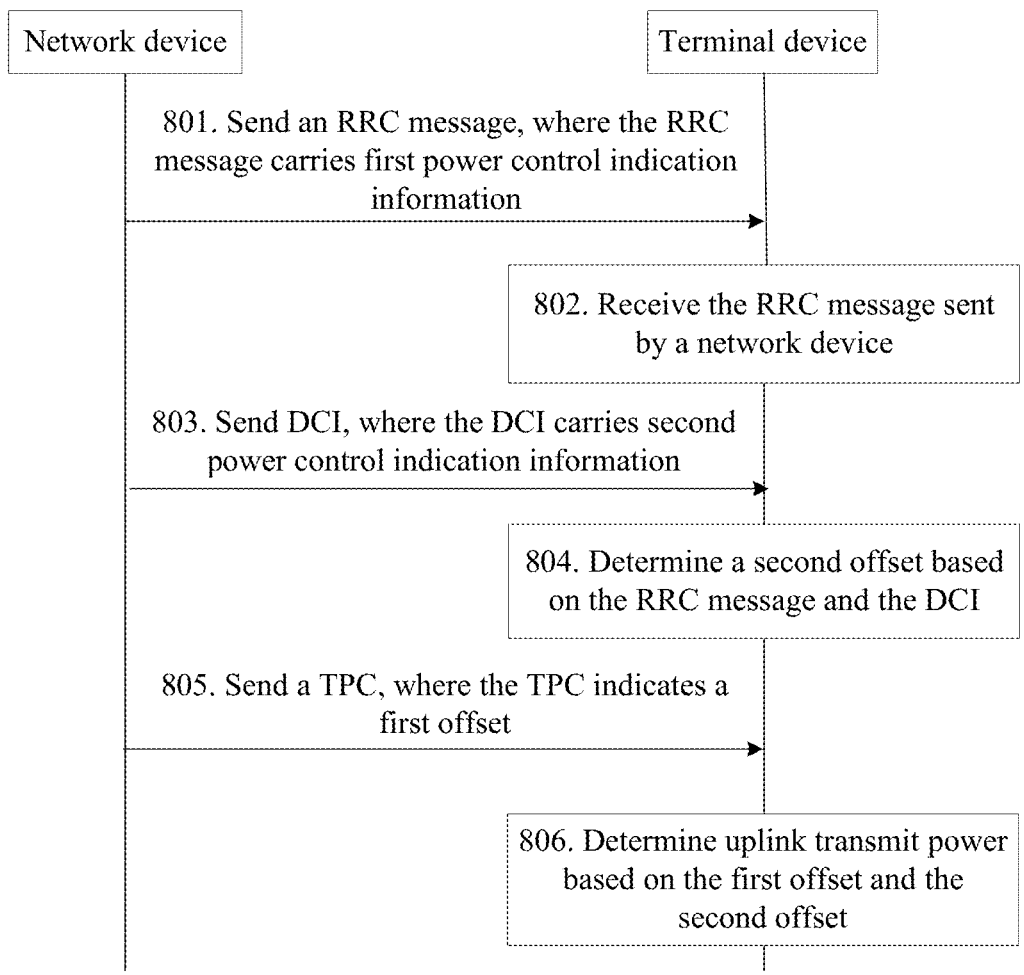
FIG. 8 is a flowchart of an uplink power control method according to an embodiment of this application.

As shown in FIG. 8, the method includes the following steps.

Step 801: A network device sends an RRC message to a terminal device, where the RRC message carries first power control indication information, the first power control indication information indicates a second power offset set, and the second power offset set includes at least one second offset.

The second power offset set includes the at least one second offset, and an index of each second offset. For example, when the second power offset set includes four second offsets, the four second offsets are respectively −2, −1, 0, and 1, and indexes of the four second offsets are respectively 0, 1, 2, and 3. In this case, the second power offset set is shown in Table 9 below.

TABLE 9

| Index | Second power offset set |
|---|---|
| 0 | −3 |
| 1 | 1 |
| 2 | 0 |
| 3 | 1 |

Step 802: The terminal device receives the RRC message sent by the network device.

Step 803: The network device sends DCI to the terminal device, where the DCI carries second power control indication information, and the second power control indication information indicates a second offset in the first power offset set.

The second offset is determined by the network device based on a cross interference intensity level of cross interference of the terminal device to another terminal device, the cross interference is interference caused by uplink transmission of the terminal device to downlink reception of the another terminal device, a cell on which the terminal device camps is a serving cell, and a cell on which the another terminal device camps is a neighboring cell of the serving cell. The second power control indication information may include an index of the second offset.

In this step, the DCI may be DCI used for UL or DL resource scheduling, or may be DCI dedicated for transmitting power control information.

When the DCI is DCI used for DL or UL resource scheduling, a second power control indication information bit may be added to a format of DCI carried on a PDCCH/an EPDCCH. For example, if the first power offset set includes four second offsets, two bits are added to DCI in an existing format; and 00, 01, 10, and 11 are respectively used to represent the four second offsets in Table 9, or to indicate indexes corresponding to the four offsets.

When the DCI is DCI dedicated for transmitting power control information, for example, a new DCI format is a DCI format X (DCI format 3/3A-Like). If the first power offset set includes four second offsets, the DCI that is dedicated for transmitting power control information and that carries the second offset may be in the DCI format X: -P_CLI command number 0, P_CLI command number 1, P_CLI command number 2, P_CLI command number 3, . . . , P_CLI command number N. N is related to a size of the DCI dedicated for power control information, and CRC parity bits of the DCI format X are scrambled by using a p cli-RNTI. The P_CLI command number includes 2-bit information, indicating indexes of the four second offsets.

It needs to be noted that, if the DCI is DCI dedicated for transmitting power control information, the DCI may carry second power control indication information of a plurality of terminal devices, and a second power offset to be received by the terminal device is determined based on a correspondence between a second power control indication information field of the DCI and the terminal device.

Step 804: The terminal device receives the RRC message and the DCI that are sent by the network device, and determines the second offset.

The terminal device receives the RRC message sent by the network device, determines the first power offset set, and determines, based on the DCI, the second offset indicated by the DCI from a first offset set.

It needs to be noted that, if the DCI carries second power control indication information of a plurality of terminal devices, the terminal device obtains second power control indication information of the terminal device from the DCI based on a correspondence between a device identifier of the terminal device and a power control indication information field of the DCI.

Step 805: The network device determines a TPC, and sends the TPC to the terminal device, where the TPC indicates a first offset.

Step 806: The terminal device receives the TPC sent by the network device, and determines uplink transmit power based on the first offset and the second offset.

The terminal device obtains a transmit power adjustment amount based on the first offset, and determines the uplink transmit power based on the adjustment amount and the second offset.

If control information is transmitted between the terminal device and the network device through a physical uplink channel and a format of the DCI is a format 1A/1B/1D/1/2A/2B/2C/2D/2/3, transmit power of the physical uplink control channel may be determined in the following first manner in this step; or if control information is transmitted between the terminal device and the network device through a physical uplink control channel and a format of the DCI is a format 4/5, transmit power of the physical uplink control channel may be determined in the following second manner in this step; or if data information is transmitted between the terminal device and the network device through a physical uplink shared channel, transmit power of the physical uplink shared channel may be determined in the following third manner in this step; or if data information is transmitted between the terminal device and the network device through a physical uplink shared channel, and control information is transmitted between the terminal device and the network device through a physical uplink control channel, transmit power of the physical uplink shared channel may be determined in the following fourth manner in this step. If SRS information is transmitted between the terminal device and the network device through an SRS channel, this step may be implemented in the following fifth manner.

For the first implementation, when the terminal device determines the uplink transmit power based on the adjustment amount and the second offset, the terminal device further needs to obtain maximum transmit power $P_{CMAX,c}(i)$, transmit power $P_{o\_PUCCH}$ that the network device expects to receive and that is of an uplink control channel, a downlink path loss estimate $PL_c$, a first power parameter value $h(n_{CQI}, n_{HARQ}, n^{SR})$ corresponding to a third preset format, a second power parameter value $\Delta_{F\_PUCCH}(F)$ that is configured by the network device for the terminal device and that is of the physical uplink control channel, and a third power parameter value $\Delta_{TxD}(F')$ that is configured by the network device for the terminal device and that is of the physical uplink control channel; and correspondingly, the step in which the terminal device determines the uplink transmit power based on the adjustment amount and the second offset may be:

the terminal device determines transmit power of the physical uplink control channel based on $P_{CMAX,c}(i)$, $P_{o\_PUCCH}$, $PL_c$, $h(n_{CQI}, n_{HARQ}, n_{SR})$, $\Delta_{F\_PUCCH}(F)$, $\Delta_{TxD}(F')$, the adjustment amount, and the second offset.

For the second implementation, when the terminal device determines the uplink transmit power based on the adjustment amount and the second offset, the terminal device further needs to obtain maximum transmit power $P_{CMAX,c}(i)$ of the terminal device, transmit power $P_{o\_PUCCH}$ that the network device expects to receive and that is of a physical uplink control channel, a downlink path loss estimate $PL_c$, a quantity $M_{PUSCH,c}(i)$ of RBs allocated by the network device to the terminal device during transmission of the physical uplink control channel, an offset $\Delta_{TF,\ c}(i)$ related to an MCS, and a second power parameter value $\Delta_{F\_PUCCH}(F)$ that is configured by the network device for the terminal device and that is of the physical uplink control channel; and correspondingly, the step in which the terminal device determines the uplink transmit power based on the adjustment amount and the second offset may be:

the terminal device determines transmit power of the physical uplink control channel based on $P_{CMAX,c}(i)$, $P_{o\_PUCCH}$, $PL_c$, $M_{PUSCH,c}(i)$, $\Delta_{TF,\ c}(i)$, $\Delta_{F\_PUCCH}(F)$, the adjustment amount, and the second offset.

For the third implementation, when the terminal device determines the uplink transmit power based on the adjustment amount and the second offset, the terminal device further needs to obtain maximum transmit power $P_{CMAX,c}(i)$ of the terminal device, a quantity $M_{PUSCH,c}(i)$ of RBs allocated by the network device to the terminal device during transmission of a physical uplink control channel, transmit power $P_{o\_PUSCH}(j)$ that the network device expects to receive and that is of the physical uplink shared channel, a path loss compensation factor $\alpha_c(i)$, a downlink path loss estimate $PL_c$, and an offset $\Delta_{TF,\ c}(i)$ related to an MCS; and correspondingly, the step in which the terminal device determines the uplink transmit power based on the adjustment amount and the second offset may be:

the terminal device determines transmit power of the physical uplink shared channel based on $P_{CMAX,c}(i)$, $M_{PUSCH,c}(i)$, $P_{o\_PUSCH}(j)$, $\alpha_c(i)$, $PL_c$, $\Delta_{TF,\ c}(i)$ the adjustment amount, and the second offset.

For the fourth implementation, when the terminal device determines the uplink transmit power based on the adjustment amount and the second offset, the terminal device further needs to obtain a linear value $\hat{P}_{CMAX,c}(i)$ maximum transmit power of the terminal device, a linear value $\hat{P}_{PUCCH}(i)$ of transmit power of a physical uplink control channel, a quantity $M_{PUSCH,c}(i)$ of RBs allocated by the network device to the terminal device during transmission of a physical uplink control channel, transmit power $P_{o\_PUSCH}(j)$ that the network device expects to receive and that is of the physical uplink shared channel, a path loss compensation factor $\alpha_c(i)$, a downlink path loss estimate $PL_c$, and an offset $\Delta_{TF,\ c}(i)$ related to an MCS; and correspondingly, the step in which the terminal device determines the uplink transmit power based on the adjustment amount and the second offset may be:

the terminal device determines transmit power of the physical uplink shared channel based on $\hat{P}_{CMAX,c}(i)$, $\hat{P}_{PUCCH}(i)$, $M_{PUSCH,c}(i)$, $P_{o\_PUSCH}(j)$, $\alpha_c(i)$, $PL_c$, $\Delta_{TF,\ c}(i)$, the adjustment amount, and the second offset.

For the fifth implementation, when the terminal device determines the uplink transmit power based on the adjustment amount and the second offset, the terminal device further needs to obtain maximum transmit power $P_{CMAX,c}(i)$ of the terminal device, transmit power $P_{SRS\_OFFSET,c}(m)$ that the network device expects to receive and that is of an SRS channel, a quantity $M_{SRS,c}$ of RBs allocated by the network device to the terminal device during transmission of the SRS channel, a quantity $M_{PUSCH,c}(j)$ of RBs allocated by the network device to the terminal device during transmission of a physical uplink control channel, a downlink path loss estimate $PL_c$, and a path loss compensation factor $\alpha_c(i)$; and correspondingly, the step in which the terminal device determines the uplink transmit power based on the adjustment amount and the second offset may be:

the terminal device determines transmit power of the uplink SRS channel based on $P_{CMAX,c}(i)$, $P_{SRS\_OFFSET,c}(m)$, $M_{SRS,c}$, $M_{PUSCH,c}(j)$, $PL_c$, $\alpha_c(i)$, the adjustment amount, and the second offset.

For a specific calculation formula for determining the uplink power, refer to step 505. Details are not described herein again.

It needs to be noted that, any DCI in this embodiment of this application is described by using a CDI format in LTE as an example, but is not limited to DCI in LTE. Alternatively, the DCI in this embodiment of this application may be DCI in another wireless communications system, for example, DCI in an NR or 5G system. In other words, the uplink power control method provided in this embodiment of this application may be used in LTE, an NR, or 5G to determine uplink transmit power.

In this embodiment of this application, cross interference between the terminal device and another terminal device is considered. The terminal device receives the first power control indication information and the second power control indication information that are sent by the network device; and determines the second offset based on the first power control indication information and the second power control indication information, where the second offset is determined by the network device based on cross interference measurement of the terminal device, and the cross interference is caused by uplink transmission of the terminal device to downlink reception of another terminal device. The terminal device receives the first offset sent by the network device, and determines the uplink transmit power based on the first offset and the second offset. Because impact of the cross interference is considered in determining the uplink transmit power, the method can be applied to an NR or 5G. In addition, cross interference to another terminal device is alleviated when the uplink transmit power is determined according to the foregoing method.

Figure 9:
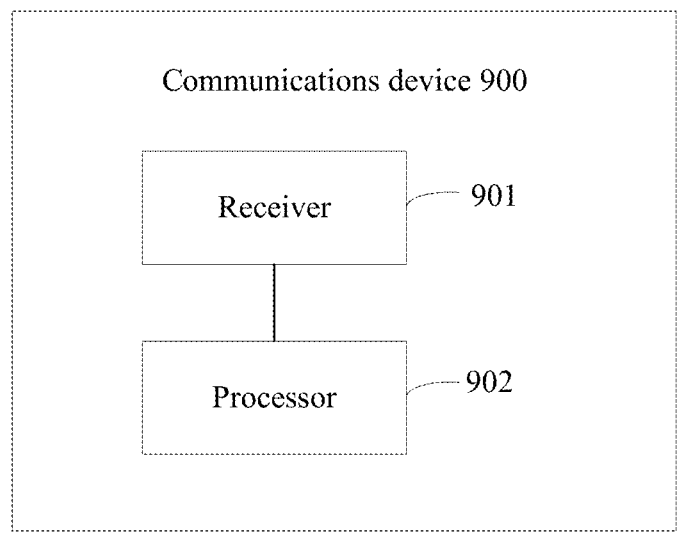
FIG. 9 is a schematic structural diagram of a communications device according to an embodiment of this application.

An embodiment of this application further provides a communications device 900. The communications device 900 is configured to implement functions of the terminal device in the foregoing method embodiments. As shown in FIG. 9, the communications device 900 may include:

a receiver 901, configured to receive power control indication information sent by a network device, where the power control indication information indicates a first power offset set, and the first power offset set is any one of at least two power offset sets, where the receiver 901 is further configured to receive a transmit power control TPC command sent by the network device, where the TPC indicates a first offset in the first power offset set; and a processor 902, configured to determine uplink transmit power based on the first offset.

In a possible implementation, the receiver 901 is further configured to receive a radio resource control RRC message sent by the network device, where the RRC message carries the power control indication information.

In a possible implementation, the receiver 901 is further configured to receive downlink control information DCI sent by the network device, where the DCI carries the power control indication information.

In a possible implementation, a preset bit of the TPC indicates the power control indication information.

In a possible implementation, the at least two power offset sets are determined based on at least two interference intensity levels of cross interference of the terminal device, and the cross interference is interference caused by uplink transmission of the terminal device to downlink reception of another terminal device.

In a possible implementation, the processor 902 is further configured to: obtain a transmit power adjustment amount based on the first offset, and determine the uplink transmit power based on the adjustment amount.

In a possible implementation, the processor 902 is further configured to determine maximum transmit power $P_{CMAX,c}$ of the terminal device, transmit power $P_{o\_PUSCH}$ that the network device expects to receive and that is of a physical uplink shared channel, a downlink path loss estimate $PL_c$, a quantity $M_{PUSCH,c}$ of resource blocks RBs allocated by the network device to the terminal device during transmission of the physical uplink shared channel, a path loss compensation factor $\alpha_c$, and an offset $\Delta_{TF,\,c}$ related to an MCS; and the processor 902 is further configured to determine transmit power of the physical uplink shared channel based on $P_{CMAX,c}$, $P_{o\_PUSCH}$, $PL_c$, $M_{PUSCH,c}$, $\alpha_c$, $\Delta_{TF,\,c}$, and the adjustment amount.

In a possible implementation, the processor 902 is further configured to determine maximum transmit power $P_{CMAX,c}$ of the terminal device, transmit power $P_{o\_PUCCH}$ that the network device expects to receive and that is of a physical uplink control channel, a downlink path loss estimate $PL_c$, a first power parameter value $h(n_{CQI}, n_{HARQ}, n_{SR})$, a second power parameter value $\Delta_{F\_PUCCH}(F)$ that is configured by the network device for the terminal device and that is of the physical uplink control channel, and a third power parameter value $\Delta_{TxD}(F')$ that is configured by the network device for the terminal device and that is of the physical uplink control channel; and the processor 902 is further configured to determine transmit power of the physical uplink control channel based on $P_{CMAX,c}$, $P_{o\_PUCCH}$, $PL_c$, $h(n_{CQI}, n_{HARQ}, n_{SR})$, $\Delta_{F\_PUCCH}(F)$, $\Delta_{TxD}(F')$, and the adjustment amount.

The communications device 900 in this embodiment of this application may further include a memory. The memory may be configured to store data and program code of the communications device 900. It may be understood that FIG. 9 shows only a simplified design of the communications device 900. During actual application, the communications device 900 may include any quantity of transmitters, receivers, processors, memories, or the like, and all communications devices that can implement this embodiment of this application fall within the protection scope of this application.

It should be understood that, the foregoing and other operations and/or functions of each unit in the communications device shown in FIG. 9 in this embodiment of this application are respectively intended to implement any one of the corresponding uplink power control processes in FIG. 2 to FIG. 8. For brevity, details are not described herein again.

Figure 10:
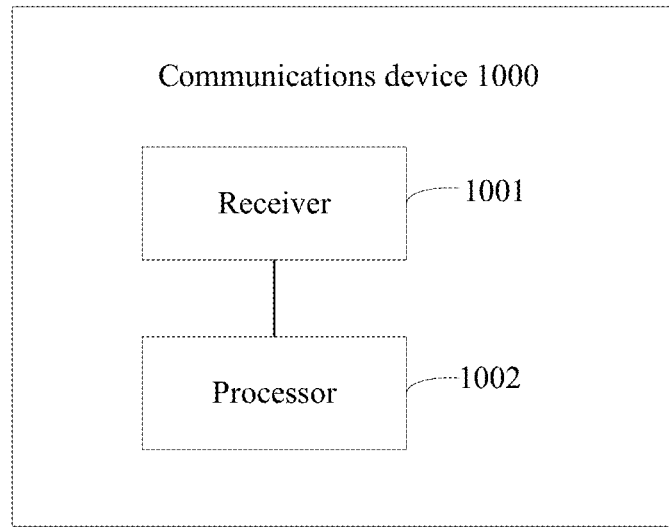
FIG. 10 is a schematic structural diagram of a communications device according to an embodiment of this application.

An embodiment of this application further provides a communications device, configured to implement functions of the terminal device in the foregoing method embodiments. As shown in FIG. 10, the communications device 1000 may include:

a receiver 1001, configured to receive power control indication information sent by a network device, where the power control indication information indicates a second offset, the second offset is determined by the network device based on cross interference of the terminal device, and the cross interference is interference caused by uplink transmission of the terminal device to downlink reception of another terminal device, where the receiver 1001 is further configured to receive a transmit power control TPC command sent by the network device, where the TPC indicates a first offset; and a processor 1002, configured to determine uplink transmit power based on the first offset and the second offset.

In a possible implementation, the receiver 1001 is further configured to receive a radio resource control RRC message sent by the network device, where the RRC message carries the power control indication information.

In a possible implementation, the receiver 1001 is further configured to receive downlink control information DCI sent by the network device, where the DCI carries the power control indication information.

In a possible implementation, the processor 1002 is further configured to: obtain a transmit power adjustment amount based on the first offset, and determine the uplink transmit power based on the adjustment amount and the second offset.

The communications device 1000 in this embodiment of this application may further include a memory. The memory may be configured to store data and program code of the communications device 1000. It may be understood that FIG. 10 shows only a simplified design of the communications device 1000. During actual application, the communications device 1000 may include any quantity of transmitters, receivers, processors, memories, or the like, and all communications devices that can implement this embodiment of this application fall within the protection scope of this application.

It should be understood that, the foregoing and other operations and/or functions of each unit in the communications device shown in FIG. 10 in this embodiment of this application are respectively intended to implement any one of the corresponding uplink power control processes in FIG. 2 to FIG. 8. For brevity, details are not described herein again.

Figure 11:
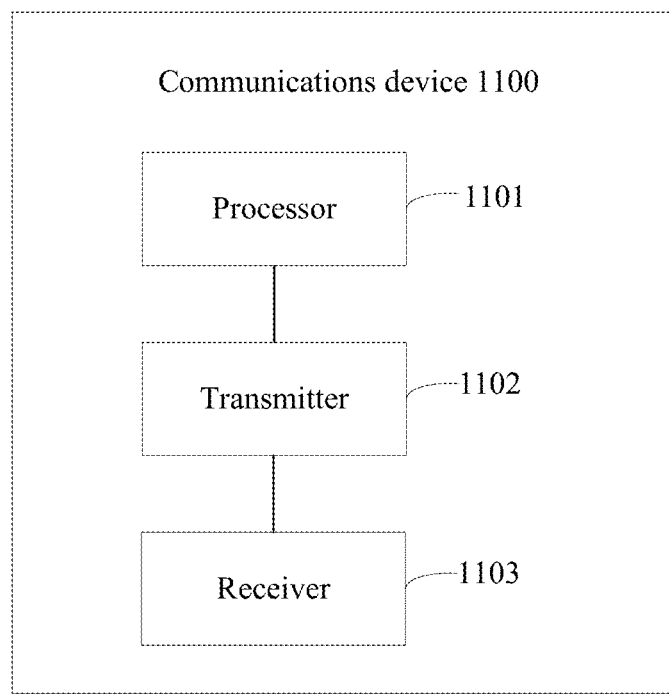
FIG. 11 is a schematic structural diagram of a communications device according to an embodiment of this application.

An embodiment of this application further provides a communications device 1100. The communications device 1100 is configured to implement functions of the network device in the foregoing method embodiments. As shown in FIG. 11, the communications device 1100 may include:

a processor 1101, configured to: determine power control indication information, and determine a transmit power control TPC command, where the power control indication information indicates a first power offset set, the first power offset set is any one of at least two power offset sets, and the TPC indicates a first offset in the first power offset set; and a transmitter 1102, configured to: send the power control indication information to a terminal device, and send the TPC to the terminal device, where the power control indication information and the TPC are used by the terminal device to determine the first offset and determine uplink transmit power based on the first offset.

In a possible implementation, the transmitter 1102 is further configured to send a radio resource control RRC message to the terminal device, where the RRC message carries the power control indication information.

In a possible implementation, the transmitter 1102 is further configured to send downlink control information DCI to the terminal device, where the DCI carries the power control indication information.

In a possible implementation, a preset bit of the TPC indicates the power control indication information.

In a possible implementation, the at least two power offset sets are determined by the network device based on at least two interference intensity levels of cross interference of the terminal device to another terminal device, the cross interference is interference caused by uplink transmission of the terminal device to downlink reception of the another terminal device, a cell on which the terminal device camps is a serving cell, and a cell on which the another terminal device camps is a neighboring cell of the serving cell.

In a possible implementation, the communications device 1100 may further include a receiver 1103;

the receiver 1103 is configured to receive interactive information sent by a network device in a neighboring cell; and the processor 1101 is further configured to determine the power control indication information based on the interactive information, where the interactive information includes resource scheduling information.

In a possible implementation, the receiver 1103 is further configured to receive cross interference measurement report information sent by the terminal device; and the processor 1101 is further configured to determine the power control indication information based on the cross interference measurement report information.

The communications device 1100 in this embodiment of this application may further include a memory. The memory may be configured to store data and program code of the communications device 1000. It may be understood that FIG. 11 shows only a simplified design of the communications device 1100. During actual application, the communications device 1100 may include any quantity of transmitters, receivers, processors, memories, or the like, and all communications devices that can implement this embodiment of this application fall within the protection scope of this application.

It should be understood that, the foregoing and other operations and/or functions of each unit in the communications device shown in FIG. 11 in this embodiment of this application are respectively intended to implement any one of the corresponding uplink power control processes in FIG. 2 to FIG. 8. For brevity, details are not described herein again.

Figure 12:
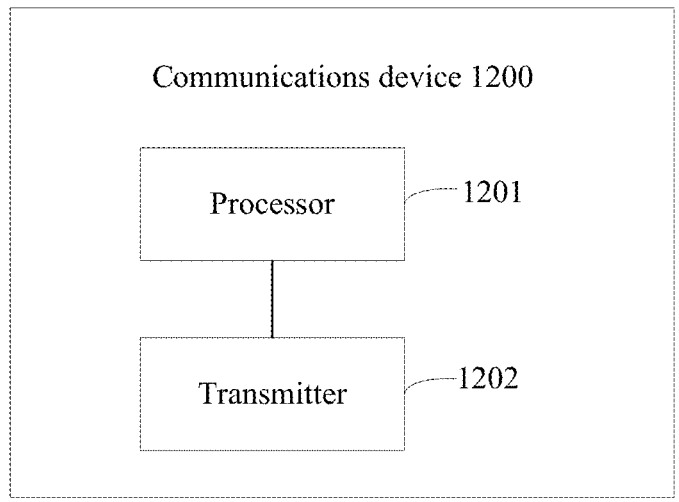
FIG. 12 is a schematic structural diagram of a communications device according to an embodiment of this application.

An embodiment of this application further provides a communications device 1200. The communications device 1200 is configured to implement functions of the network device in the foregoing method embodiments. As shown in FIG. 12, the communications device 1200 may include:

a processor 1201, configured to: determine power control indication information, and determine a transmit power control TPC command, where the power control indication information indicates a second offset; and a transmitter 1202, configured to: send the power control indication information to a terminal device, and send the TPC to the terminal device, where the TPC indicates a first offset, and the first offset and the second offset are used by the terminal device to determine uplink transmit power.

In a possible implementation, the transmitter 1202 is further configured to send a radio resource control RRC message to the terminal device, where the RRC message carries the power control indication information.

In a possible implementation, the transmitter 1202 is further configured to send downlink control information DCI to the terminal device, where the DCI carries the power control indication information.

In a possible implementation, the power control indication information includes first power control indication information and second power control indication information; and the transmitter 1202 is further configured to send an RRC message to the terminal device, where the RRC message carries the first power control indication information, the first power control indication information indicates a second power offset set, and the second power offset set includes at least one second offset; and the transmitter 1202 is further configured to send DCI to the terminal device, where the DCI carries the second power control indication information, and the second power control indication information indicates the second offset in the second power offset set.

In a possible implementation, the second offset is determined by the network device based on a cross interference intensity level of cross interference of the terminal device to another terminal device, the cross interference is interference caused by uplink transmission of the terminal device to downlink reception of the another terminal device, a cell on which the terminal device camps is a serving cell, and a cell on which the another terminal device camps is a neighboring cell of the serving cell.

In a possible implementation, the processor 1201 is configured to: obtain an interference intensity level of cross interference, and obtain the power control indication information based on the interference intensity level.

Figure 13:
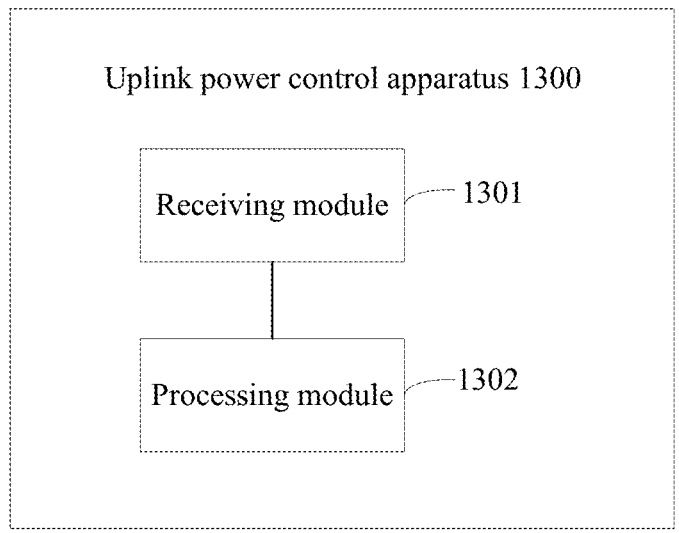
FIG. 13 is a schematic structural diagram of an uplink power control apparatus according to an embodiment of this application.

FIG. 13 shows an example structure of the uplink power control apparatus in the embodiments of this application. It should be understood that, an uplink power control apparatus 1300 shown in FIG. 13 is only an example, and the uplink power control apparatus in the embodiments of this application may further include another module or unit, or may include a module whose functions are similar to functions of each module in FIG. 13.

A receiving module 1301 may be configured to implement functions that are implemented by the receiver 901 in FIG. 9, and a processing module 1302 may be configured to implement functions that are implemented by the processor 902 in FIG. 9.

Figure 14:
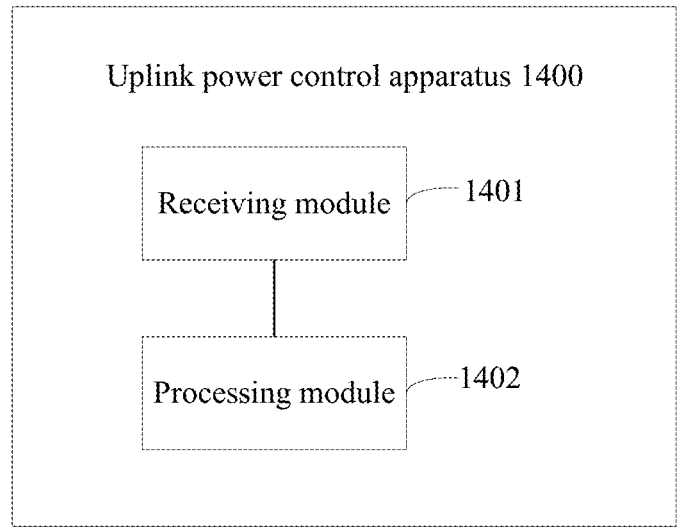
FIG. 14 is a schematic structural diagram of an uplink power control apparatus according to an embodiment of this application.

FIG. 14 shows another example structure of the uplink power control apparatus in the embodiments of this application. It should be understood that, an uplink power control apparatus 1400 shown in FIG. 14 is only an example, and the uplink power control apparatus in the embodiments of this application may further include another module or unit, or may include a module whose functions are similar to functions of each module in FIG. 14.

A receiving module 1401 may be configured to implement functions that are implemented by the receiver 1001 in FIG. 10, and a processing module 1402 may be configured to implement functions that are implemented by the processor 1002 in FIG. 10.

Figure 15:
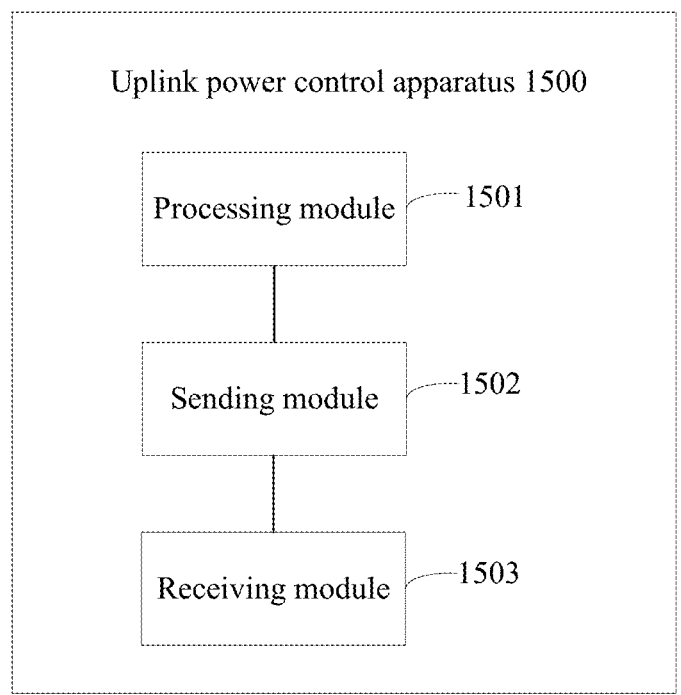
FIG. 15 is a schematic structural diagram of an uplink power control apparatus according to an embodiment of this application.

FIG. 15 shows another example structure of the uplink power control apparatus in the embodiments of this application. It should be understood that, an uplink power control apparatus 1500 shown in FIG. 15 is only an example, and the uplink power control apparatus in the embodiments of this application may further include another module or unit, or may include a module whose functions are similar to functions of each module in FIG. 13.

A processing module 1501 may be configured to implement functions that are implemented by the processor 1101 in FIG. 11, a sending module 1502 may be configured to implement functions that are implemented by the transmitter 1102 in FIG. 11, and a receiving module 1503 may be configured to implement functions that are implemented by the receiver 1103 in FIG. 11.

Figure 16:
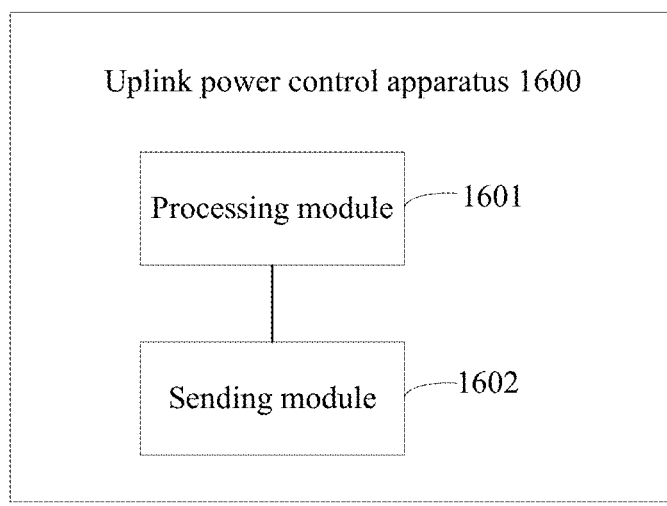
FIG. 16 is a schematic structural diagram of an uplink power control apparatus according to an embodiment of this application.

FIG. 16 shows another example structure of the uplink power control apparatus in the embodiments of this application. It should be understood that, an uplink power control apparatus 1600 shown in FIG. 16 is only an example, and the uplink power control apparatus in the embodiments of this application may further include another module or unit, or may include a module whose functions are similar to functions of each module in FIG. 14.

A processing module 1601 may be configured to implement functions that are implemented by the processor 1201 in FIG. 12, and a sending module 1602 may be configured to implement functions that are implemented by the transmitter 1202 in FIG. 12.

Furthermore, the processor in the foregoing embodiments may be a central processing unit (CPU), a general purpose processor, a digital signal processor (DSP), an application-specific integrated circuit (ASIC), a field programmable gate array (FPGA) or another programmable logical device, a transistor logical device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor.

Method or algorithm steps described with reference to the content disclosed in this application may be implemented by hardware, or may be implemented by a processor by executing a software instruction. The software instruction may include a corresponding software module, and the software module may be located in a RAM memory, a flash memory, a ROM memory, an EPROM memory, an EEPROM memory, a register, a hard disk, a removable hard disk, a CD-ROM, or a storage medium in any other form known in the art. An example storage medium is coupled to a processor, so that the processor can read information from the storage medium or write information into the storage medium. Certainly, the storage medium may be a component of the processor. The processor and the storage medium may be located in an ASIC. In addition, the ASIC may be located in a terminal. Certainly, the processor and the storage medium may exist as discrete components in a terminal.

A person skilled in the art should be aware that, in the foregoing one or more examples, the functions described in this application may be implemented by hardware, software, firmware, or any combination thereof. When being implemented by software, these functions may be stored in a computer readable medium or transmitted as one or more instructions or as code in the computer readable medium. The computer readable medium includes a computer storage medium and a communications medium. The communications medium includes any medium that enables a computer program to be transmitted from one place to another place. The storage medium may be any usable medium accessible to a general-purpose or special-purpose computer.

In the foregoing specific implementations, the objectives, technical solutions, and beneficial effects of this application are further described in detail. It should be understood that the foregoing descriptions are merely specific implementations of this application, but are not intended to limit the protection scope of this application. All modifications, equivalent replacements, improvements, or the like made based on the technical solutions of this application shall fall within the protection scope of this application.

What is claimed is:

1. An uplink power control method for a terminal device, wherein the method comprises:
receiving a power control indication information sent by a network device, wherein the power control indication information indicates a first power offset set, and the first power offset set is any one of at least two power offset sets;
receiving a transmit power control (TPC) command sent by the network device, wherein the TPC indicates a first offset in the first power offset set; and
determining an uplink transmit power for a physical uplink shared channel (PUSCH) based on the first offset, wherein the determining the uplink transmit power for the PUSCH comprises:
obtaining a transmit power adjustment amount $f_c(i)$ based on the first offset;
obtaining a maximum transmit power value ($\hat{P}_{CMAX,c}(i)$) of the terminal device,
obtaining a transmit power value ($\hat{P}_{PUCCH}(i)$) of a physical uplink control channel (PUCCH),
obtaining a quantity ($M_{PUSCH,c}(i)$) of resource blocks (RBs) allocated by the network device to the terminal device during a transmission on the PUSCH,
obtaining a transmit power value ($P_{o\_PUSCH,c}(i)$) that the network device expects to receive and that is of the PUSCH,
obtaining a path loss compensation factor ($\alpha_c(i)$),
obtaining a downlink path loss estimate ($PL_c$), and
obtaining an offset ($\Delta_{TF,c}$) related to a modulation and coding scheme (MCS);
wherein the terminal device calculates, on a per-subframe basis and exclusively using parameter values specified on a per-subframe basis, the uplink transmit power for the PUSCH is determined according to the following:

$$P_{PUSCH,c}(i) = \min \begin{Bmatrix} 10\log_{10}(\hat{P}_{CMAX,c}(i) - \hat{P}_{PUCCH}(i)), \\ 10\log_{10}(M_{PUSCH,c}(i)) + P_{o\_PUSCH,c}(i) + \alpha_c(i) \cdot PL_c + \Delta_{TF,c}(i) + f_{L,c}(i) \end{Bmatrix}$$

where:
$P_{PUSCH,c}(i)$ is the uplink transmit power for the PUSCH, and
i indicates a subframe identifier of a subframe for which the uplink transmit power for the PUSCH is determined.

2. The method according to claim 1, wherein the receiving power control indication information comprises:
receiving a radio resource control (RRC) message sent by the network device, wherein the RRC message carries the power control indication information.

3. The method according to claim 1, wherein the receiving power control indication information comprises:

receiving a downlink control information (DCI) sent by the network device, wherein the DCI carries the power control indication information.

4. The method according to claim 1, wherein a preset bit of the TPC indicates the power control indication information.

5. The method according to claim 1, wherein the at least two power offset sets are determined by the network device based on at least two interference intensity levels of cross interference of the terminal device to another terminal device,
wherein the cross interference is interference caused by uplink transmission of the terminal device to downlink reception of the another terminal device,
wherein a cell on which the terminal device camps is a serving cell, and
wherein a cell on which the another terminal device camps is a neighboring cell of the serving cell.

6. The uplink power control method for a terminal device of claim 1, wherein the power control indication information indicates a second offset; and
wherein the determining an uplink transmit power is based on the first offset and the second offset.

7. The method according to claim 6, wherein the power control indication information comprises first power control indication information and second power control indication information; and
wherein correspondingly, the receiving the power control indication information sent by a network device comprises:
receiving an RRC message sent by the network device, wherein the RRC message carries the first power control indication information, wherein the first power control indication information indicates a second power offset set, and wherein the second power offset set comprises at least one second offset; and
receiving a downlink control information (DCI) sent by the network device, wherein the DCI carries the second power control indication information, and wherein the second power control indication information indicates the second offset in the second power offset set.

8. The method according to claim 6, wherein the second offset is determined by the network device based on a cross interference intensity level of cross interference of the terminal device to another terminal device,
wherein the cross interference is interference caused by uplink transmission of the terminal device to downlink reception of the another terminal device,
wherein a cell on which the terminal device camps is a serving cell, and
wherein a cell on which the another terminal device camps is a neighboring cell of the serving cell.

9. The method according to claim 6, wherein the determining uplink transmit power based on the first offset and the second offset comprises:
obtaining a transmit power adjustment amount based on the first offset; and
determining the uplink transmit power based on the adjustment amount and the second offset.

10. A communications device, wherein the communications device comprises:
a receiver,
a processor; and
a non-transitory storage medium carrying a program code, wherein the program code, when executed by the processor facilitates performing a programmed processor-implemented method comprising:
receiving, by the receiver in cooperation with the processor, power control indication information sent by a network device, wherein the power control indication information indicates a first power offset set, and the first power offset set is any one of at least two power offset sets;
receiving, by the receiver in cooperation with the processor, a transmit power control (TPC) command sent by the network device, wherein the TPC indicates a first offset in the first power offset set; and
determining, by the processor, an uplink transmit power for a physical uplink shared channel (PUSCH) based on the first offset, wherein the determining the uplink transmit power for the PUSCH comprises:
obtaining a transmit power adjustment amount $f_c(i)$ based on the first offset;
obtaining a maximum transmit power value ($\hat{P}_{CMAX,c}(i)$) of the terminal device,
obtaining a transmit power value ($\hat{P}_{PUCCH}(i)$) of a physical uplink control channel (PUCCH),
obtaining a quantity ($M_{PUSCH,c}(i)$) of resource blocks (RBs) allocated by the network device to the terminal device during a transmission on the PUSCH,
obtaining a transmit power value ($P_{O\_PUSCH,c}(i)$) that the network device expects to receive and that is of the PUSCH,
obtaining a path loss compensation factor ($\alpha_c(i)$),
obtaining a downlink path loss estimate ($PL_c$), and
obtaining an offset ($\Delta_{TF,c}$) related to a modulation and coding scheme (MCS);
wherein the communication device calculates, on a per-subframe basis and exclusively using parameter values specified on a per-subframe basis, the uplink transmit power for the PUSCH is determined according to the following:

$$P_{PUSCH,c}(i) = \min \begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(i) + \alpha_c(i) \cdot PL_c + \Delta_{TF,c}(i) + f_{Lc}(i) \end{Bmatrix}$$

where:
$P_{PUSCH,c}(i)$ is the uplink transmit power for the PUSCH, and
i indicates a subframe identifier of a subframe for which the uplink transmit power for the PUSCH is determined.

11. The communications device according to claim 10, wherein the method further comprises receiving, by the receiver in cooperation with the processor, a radio resource control (RRC) message sent by the network device, wherein the RRC message carries the power control indication information.

12. The communications device according to claim 10, wherein the method further comprises receiving, by the receiver in cooperation with the processor, a downlink control information (DCI) sent by the network device, wherein the DCI carries the power control indication information.

13. The communications device according to claim 10, wherein a preset bit of the TPC indicates the power control indication information.

14. The communications device according to claim 10, wherein the at least two power offset sets are determined by the network device based on at least two interference intensity levels of cross interference of the terminal device to another terminal device,
- wherein the cross interference is interference caused by uplink transmission of the terminal device to downlink reception of the another terminal device,
- wherein a cell on which the terminal device camps is a serving cell, and
- wherein a cell on which the another terminal device camps is a neighboring cell of the serving cell.

* * * * *

UNITED STATES PATENT AND TRADEMARK OFFICE
CERTIFICATE OF CORRECTION

PATENT NO. : 11,089,552 B2
APPLICATION NO. : 16/503296
DATED : August 10, 2021
INVENTOR(S) : Wang et al.

It is certified that error appears in the above-identified patent and that said Letters Patent is hereby corrected as shown below:

In the Claims

Claim 1: Column 48, Line 52:

"$$P_{PUSCH,c}(i) = \min \begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(i) + \alpha_c(i) \cdot PL_c + \Delta_{TF,c}(i) + f_{Lc}(i) \end{cases}$$" should read $$P_{\text{PUSCH},c}(i) = \min \begin{cases} 10\log_{10}\left(\hat{P}_{\text{CMAX},c}(i) - \hat{P}_{\text{PUCCH}}(i)\right), \\ 10\log_{10}(M_{\text{PUSCH},c}(i)) + P_{\text{O\_PUSCH},c}(i) + \alpha_c(i) \cdot PL_c + \Delta_{\text{TF},c}(i) + f_c(i) \end{cases}$$
--.

Claim 10: Column 50, Line 44:

"$$P_{PUSCH,c}(i) = \min \begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(i) + \alpha_c(i) \cdot PL_c + \Delta_{TF,c}(i) + f_{Lc}(i) \end{cases}$$" should read $$P_{\text{PUSCH},c}(i) = \min \begin{cases} 10\log_{10}\left(\hat{P}_{\text{CMAX},c}(i) - \hat{P}_{\text{PUCCH}}(i)\right), \\ 10\log_{10}(M_{\text{PUSCH},c}(i)) + P_{\text{O\_PUSCH},c}(i) + \alpha_c(i) \cdot PL_c + \Delta_{\text{TF},c}(i) + f_c(i) \end{cases}$$
--.

Signed and Sealed this
Twelfth Day of July, 2022

Katherine Kelly Vidal
*Director of the United States Patent and Trademark Office*